(12) United States Patent
Kent

(10) Patent No.: US 12,450,029 B1
(45) Date of Patent: Oct. 21, 2025

(54) TOP DOWN MERGE SORT METHOD AND APPARATUS

(71) Applicant: Robert Bernard Kent, Albuquerque, NM (US)

(72) Inventor: Robert Bernard Kent, Albuquerque, NM (US)

( * ) Notice: Subject to any disclaimer, the term of this patent is extended or adjusted under 35 U.S.C. 154(b) by 0 days.

(21) Appl. No.: 18/927,131

(22) Filed: Oct. 25, 2024

Related U.S. Application Data

(60) Provisional application No. 63/593,707, filed on Oct. 27, 2023.

(51) Int. Cl.
*G06F 7/16* (2006.01)
(52) U.S. Cl.
CPC ..................................... *G06F 7/16* (2013.01)
(58) Field of Classification Search
None
See application file for complete search history.

(56) References Cited

U.S. PATENT DOCUMENTS

| | | | |
|---|---|---|---|
| 3,418,632 A | 12/1968 | Batcher | |
| 3,428,946 A | 2/1969 | Batcher | |
| 4,922,246 A | 5/1990 | Cormen et al. | |
| 5,216,420 A | 6/1993 | Munter | |
| 7,281,009 B2 | 10/2007 | Adas et al. | |
| 10,101,965 B1* | 10/2018 | Bhat | G06F 7/24 |
| 10,523,596 B1 | 12/2019 | Ferger et al. | |
| 11,360,740 B1* | 6/2022 | Kent | G06F 7/24 |
| 11,693,623 B1 | 7/2023 | Kent et al. | |
| 11,803,509 B1 | 10/2023 | Nie et al. | |
| 12,093,663 B1 | 9/2024 | Kent et al. | |
| 12,306,776 B1 | 5/2025 | Kent | |
| 2004/0151039 A1 | 8/2004 | Lee et al. | |
| 2004/0162817 A1* | 8/2004 | Boskovic | G06F 17/18 |
| 2006/0113648 A1 | 6/2006 | Chung et al. | |
| 2013/0339903 A1* | 12/2013 | Cheng | G06F 3/0482 |
| | | | 715/833 |
| 2014/0164402 A1* | 6/2014 | Haws | G06F 7/08 |
| | | | 707/752 |
| 2015/0195375 A1* | 7/2015 | Danziger | G06F 40/18 |
| | | | 709/203 |
| 2015/0347592 A1* | 12/2015 | Buyuktosunoglu | ......... |
| | | | G06F 12/0897 |
| | | | 711/122 |
| 2017/0168827 A1* | 6/2017 | Mishra | G06F 9/30145 |

(Continued)

OTHER PUBLICATIONS

Batcher, K. E., "Sorting networks and their applications", Spring Joint Computer Conference, 1968, 307-314.

(Continued)

*Primary Examiner* — Kavita Stanley
*Assistant Examiner* — Cao D Vuong
(74) *Attorney, Agent, or Firm* — Peacock Law P.C.; Justin R. Jackson; Janeen Vilven

(57) ABSTRACT

A method and apparatus for merging and sorting a plurality of lists. The method can be implemented in, and the apparatus can comprise, hardware and all phase sorting operations are preferably performed in parallel. Thus, a multistage sorting process can be implemented with 1 or more 2-sorters operating in parallel in each stage. This enables two or more lists to be sorted and merged very quickly. The input lists are preferably setup in an input array before the merge sorting operation is performed.

20 Claims, 13 Drawing Sheets

| Row | Col 2 | Col 1 | Col 0 |
|---|---|---|---|
| 5 | A_08 | A_07 | A_06 |
| 4 | A_05 | A_04 | A_03 |
| 3 | A_02 | A_01 | A_00 |
| 2 | B_06 | B_07 | B_08 |
| 1 | B_03 | B_04 | B_05 |
| 0 | B_00 | B_01 | B_02 |

A odd: 9 values
B odd: 9 values

Initial/Final 3-column Setup

A rows:
Max on left, min on right

B rows:
Max on right, min on left

(56) References Cited

U.S. PATENT DOCUMENTS

| | | | |
|---|---|---|---|
| 2017/0308578 A1* | 10/2017 | Chen | G06F 16/2456 |
| 2018/0294610 A1 | 10/2018 | Lewis | |
| 2019/0102335 A1 | 4/2019 | Tan et al. | |
| 2019/0174206 A1 | 6/2019 | Anolik et al. | |
| 2019/0273347 A1 | 9/2019 | Stikeleather et al. | |
| 2020/0124670 A1 | 4/2020 | Dux et al. | |
| 2022/0057590 A1 | 2/2022 | Crawford et al. | |
| 2022/0206746 A1 | 6/2022 | Kamiya | |
| 2024/0256673 A1 | 8/2024 | Khatri et al. | |

OTHER PUBLICATIONS

Kent, Robert B., et al., "Design of High-Speed Multiway Merge Sorting Networks Using Fast Single-Stage N-Sorters and N-Filters", IEEE Access, vol. 10, 2022, 77980-77992.

Kent, Robert B., et al., "Design, Implementation, and Analysis of High-Speed Single-Stage N-Sorters and N-Filters", IEEE Access, vol. 9, 2021, 2576-2591.

Kent, Robert B., et al., "Use of Carry Chain Logic and Design System Extensions to Construct Significantly Faster and Larger Single-Stage N-Sorters and N-Filters", IEEE Access, vol. 10, 2022, 79689-79702.

Norollah, Amin, et al., "RTHS: A Low-Cost High-Performance Real-Time Hardware Sorter, Using a Multidimensional Sorting Algorithm", IEEE Transactions on Very Large Scale Integration (VLSI) Systems, vol. 27, No. 7, 2019, 1601-1613.

Cormen, et al., "A hyperconcentrator switch for routing bit-serial messages", Journal of Parallel and Distributed Computing, vol. 10, Issue 3, 1990, 193-204.

Cormen, et al., "Introduction to Algorithms, 1st Edition, Chapter 28: Sorting Networks", The MIT Press, ISBN: 9780262530910, 1990, 634-650.

Kent, et al., "Stable Single-Stage 2-way Merge Sorters", 2024 58th Asilomar Conference on Signals, Systems, and Computers, Pacific Grove, CA, USA, 2025, 270-277.

Kent, et al., "Fast and Efficient Merge of Sorted Input Lists in Hardware Using List Offset Merge Sorters", Digital Object Identifier XXX, https://arxiv.org/pdf/2507.08658, vol. 11, 2023, 2025, 1-12.

\* cited by examiner

| Row | Col 1 | Col 0 |
|---|---|---|
| 7 | A_07 | B_07 |
| 6 | A_06 | B_06 |
| 5 | A_05 | B_05 |
| 4 | A_04 | B_04 |
| 3 | A_03 | B_03 |
| 2 | A_02 | B_02 |
| 1 | A_01 | B_01 |
| 0 | A_00 | B_00 |

(prior art)

2-D Array Setup:
Odd-Even Merge Sort

FIG. 1A
(Prior Art)

| Row | Col 1 | Col 0 |
|---|---|---|
| 7 | A_07 | B_00 |
| 6 | A_06 | B_01 |
| 5 | A_05 | B_02 |
| 4 | A_04 | B_03 |
| 3 | A_03 | B_04 |
| 2 | A_02 | B_05 |
| 1 | A_01 | B_06 |
| 0 | A_00 | B_07 |

(prior art)

2-D Array Setup:
Bitonic Merge Sort

FIG. 1B
(Prior Art)

| Row | Col 1 | Col 0 |
|---|---|---|
| 7 | A_07 | A_06 |
| 6 | A_05 | A_04 |
| 5 | A_03 | A_02 |
| 4 | A_01 | A_00 |
| 3 | B_06 | B_07 |
| 2 | B_04 | B_05 |
| 1 | B_02 | B_03 |
| 0 | B_00 | B_01 |

2-D Array Setup:
Top-Down Merge Sort
(TDMS)
A rows: Max left, min right
B rows: Max right, min left

FIG. 1C

| Row | Col 1 | Col 0 |
|---|---|---|
| 7 | o15 | o14 |
| 6 | o13 | o12 |
| 5 | o11 | o10 |
| 4 | o9 | o8 |
| 3 | o7 | o6 |
| 2 | o5 | o4 |
| 1 | o3 | o2 |
| 0 | o1 | o0 |

TDMS Row-Major
Fully Sorted Output Order

FIG. 1D

FIG. 2A — Top-Down Merge Sort (TDMS) Example

| Row | Col 1 | Col 0 |
|---|---|---|
| 7 | 15 | 14 |
| 6 | 13 | 10 |
| 5 | 9 | 6 |
| 4 | 5 | 1 |
| 3 | 12 | 16 |
| 2 | 8 | 11 |
| 1 | 4 | 7 |
| 0 | 2 | 3 |

FIG. 2B — TDMS Example Before 1st Column Sort

| Row | Col 1 | Col 0 |
|---|---|---|
| 7 | 15 | 14 |
| 6 | 13 | 10 |
| 5 | 9 | 6 |
| 4 | 5 | 1 |
| 3 | 12 | 16 |
| 2 | 8 | 11 |
| 1 | 4 | 7 |
| 0 | 2 | 3 |

FIG. 2C — TDMS Example Before 1st Row Sort

| Row | Col 1 | Col 0 |
|---|---|---|
| 7 | 15 | 16 |
| 6 | 13 | 14 |
| 5 | 12 | 11 |
| 4 | 9 | 10 |
| 3 | 8 | 7 |
| 2 | 5 | 6 |
| 1 | 4 | 3 |
| 0 | 2 | 1 |

FIG. 2D — TDMS Example Fully Sorted Output Order

| Row | Col 1 | Col 0 |
|---|---|---|
| 7 | 16 | 15 |
| 6 | 14 | 13 |
| 5 | 12 | 11 |
| 4 | 10 | 9 |
| 3 | 8 | 7 |
| 2 | 6 | 5 |
| 1 | 4 | 3 |
| 0 | 2 | 1 |

FIG. 3A

| Row | Col 1 | Col 0 |
|---|---|---|
| 4 | A_07 | A_06 |
| 3 | A_05 | A_04 |
| 2 | A_03 | A_02 |
| 1 | A_01 | A_00 |
| 0 |  | B_00 |

A even : 8 values
B odd: 1 value
Initial Setup

FIG. 3B

| Row | Col 1 | Col 0 |
|---|---|---|
| 4 | A_07 | A_06 |
| 3 | A_05 | A_04 |
| 2 | A_03 | A_02 |
| 1 | A_01 | A_00 |
| 0 |  | B_00 |

A even : 8 values
B odd: 1 value
Final Setup: 1 unpopulated

FIG. 4A

| Row | Col 1 | Col 0 |
|---|---|---|
| 4 | A_00 |  |
| 3 | B_06 | B_07 |
| 2 | B_04 | B_05 |
| 1 | B_02 | B_03 |
| 0 | B_00 | B_01 |

A odd : 1 value
B even: 8 values
Initial Setup

FIG. 4B

| Row | Col 1 | Col 0 |
|---|---|---|
| 4 | A_00 | B_07 |
| 3 | B_06 | B_05 |
| 2 | B_04 | B_03 |
| 1 | B_02 | B_01 |
| 0 | B_00 |  |

A odd-1/B even-8
Populated Cells Slide Up
Unpopulated Slide Down

FIG. 4C

| Row | Col 1 | Col 0 |
|---|---|---|
| 4 | A_00 | B_07 |
| 3 | B_06 | B_05 |
| 2 | B_04 | B_03 |
| 1 | B_02 | B_01 |
| 0 | B_00 |  |

A odd : 1 value
B even : 8 values
Final Setup: 1 unpopulated

| Row | Col 1 | Col 0 |
|---|---|---|
| 6 | A_06 | A_05 |
| 5 | A_04 | A_03 |
| 4 | A_02 | A_01 |
| 3 | A_00 | |
| 2 | B_03 | B_04 |
| 1 | B_01 | B_02 |
| 0 | | B_00 |

A odd : 7 values
B odd: 5 values
Initial Setup

*FIG. 5A*

| Row | Col 1 | Col 0 |
|---|---|---|
| 6 | A_06 | A_05 |
| 5 | A_04 | A_03 |
| 4 | A_02 | A_01 |
| 3 | A_00 | B_04 |
| 2 | B_03 | B_02 |
| 1 | B_01 | B_00 |
| 0 | | |

A odd-7/B odd-5
Populated Cells Slide Up
Unpopulated Slide Down

*FIG. 5B*

| Row | Col 1 | Col 0 |
|---|---|---|
| 6 | A_06 | A_05 |
| 5 | A_04 | A_03 |
| 4 | A_02 | A_01 |
| 3 | A_00 | B_04 |
| 2 | B_03 | B_02 |
| 1 | B_01 | B_00 |
| 0 | | |

A odd : 7 values
B odd: 5 values
Unpopulated Bottom Row

*FIG. 5C*

| Row | Col 1 | Col 0 |
|---|---|---|
| 5 | A_06 | A_05 |
| 4 | A_04 | A_03 |
| 3 | A_02 | A_01 |
| 2 | A_00 | B_04 |
| 1 | B_03 | B_02 |
| 0 | B_01 | B_00 |

A odd -7/B odd-5
Bottom Row Removed
Final Setup

*FIG. 5D*

| Row | Col 2 | Col 1 | Col 0 |
|---|---|---|---|
| 5 | A_08 | A_07 | A_06 |
| 4 | A_05 | A_04 | A_03 |
| 3 | A_02 | A_01 | A_00 |
| 2 | B_06 | B_07 | B_08 |
| 1 | B_03 | B_04 | B_05 |
| 0 | B_00 | B_01 | B_02 |

A odd : 9 values
B odd: 9 values

Initial/Final 3-column Setup

A rows:
Max on left, min on right

B rows:
Max on right, min on left

*FIG. 6*

| Row | Col 3 | Col 2 | Col 1 | Col 0 |
|---|---|---|---|---|
| 3 | A_07 | A_06 | A_05 | A_04 |
| 2 | A_03 | A_02 | A_01 | A_00 |
| 1 | B_04 | B_05 | B_06 | B_07 |
| 0 | B_00 | B_01 | B_02 | B_03 |

A even : 8 values
B even : 8 values

Initial/Final 4-column Setup

A rows: Max on left, min on right

B rows: Max on right, min on left

*FIG. 7*

| Row | Col 2 | Col 1 | Col 0 | | |
|---|---|---|---|---|---|
| 8 | A_06 | A_05 | A_04 | | |
| 7 | A_03 | A_02 | A_01 | | |
| 6 | A_00 | | | | |
| 5 | | B_06 | B_05 | B_04 | |
| 4 | | B_03 | B_02 | B_01 | |
| 3 | | B_00 | | | |
| 2 | | | C_06 | C_05 | C_04 |
| 1 | | | C_03 | C_02 | C_01 |
| 0 | | | C_00 | | |

A odd : 7 values
B odd: 7 values
C odd: 7 values

Initial Setup
Nlists = 3 ; Ncols = 3
Nrightslide = 1

All A,B,C list rows:
Max on left
Min on right

*FIG. 8A*

| Row | Col 2 | Col 1 | Col 0 | | |
|---|---|---|---|---|---|
| 8 | A_06 | A_05 | A_04 | | |
| 7 | A_03 | A_02 | A_01 | | |
| 6 | A_00 | | | | |
| 5 | B_04 | B_06 | B_05 | | |
| 4 | B_01 | B_03 | B_02 | | |
| 3 | | B_00 | | | |
| 2 | C_05 | C_04 | C_06 | | |
| 1 | C_02 | C_01 | C_03 | | |
| 0 | | | C_00 | | |

A odd : 7 values
B odd: 7 values
C odd: 7 values

Columns to the right
of the Col 0 right edge
move Ncols columns
to the left

*FIG. 8B*

| Row | Col 2 | Col 1 | Col 0 |
|---|---|---|---|
| 8 | A_06 | A_05 | A_04 |
| 7 | A_03 | A_02 | A_01 |
| 6 | A_00 | B_06 | B_05 |
| 5 | B_04 | B_03 | B_02 |
| 4 | B_01 | B_00 | C_06 |
| 3 | C_05 | C_04 | C_03 |
| 2 | C_02 | C_01 | C_00 |
| 1 | | | |
| 0 | | | |

A odd : 7 values
B odd: 7 values
C odd: 7 values

Populated cells slide up

Unpopulated cells slide down

*FIG. 8C*

| Row | Col 2 | Col 1 | Col 0 |
|---|---|---|---|
| 6 | A_06 | A_05 | A_04 |
| 5 | A_03 | A_02 | A_01 |
| 4 | A_00 | B_06 | B_05 |
| 3 | B_04 | B_03 | B_02 |
| 2 | B_01 | B_00 | C_06 |
| 1 | C_05 | C_04 | C_03 |
| 0 | C_02 | C_01 | C_00 |

A odd : 7 values
B odd: 7 values
C odd: 7 values

Unpopulated rows removed

Final Setup

*FIG. 8D*

| Row | Col 2 | Col 1 | Col 0 |
|---|---|---|---|
| 6 | o20 | o19 | o18 |
| 5 | o15 | o16 | o17 |
| 4 | o14 | o13 | o12 |
| 3 | o9 | o10 | o11 |
| 2 | o8 | o7 | o6 |
| 1 | o3 | o4 | o5 |
| 0 | o2 | o1 | o0 |

Ncols = 3

Final outputs
Serpentine Row Major sorted order

*FIG. 9*

| Row | Col 2 | Col 1 | Col 0 |
|---|---|---|---|
| 6 | 19 | 17 | 14 |
| 5 | 9 | 8 | 3 |
| 4 | 1 | 18 | 16 |
| 3 | 15 | 11 | 10 |
| 2 | 5 | 4 | 21 |
| 1 | 20 | 13 | 12 |
| 0 | 7 | 6 | 2 |

A odd : 7 values
B odd: 7 values
C odd: 7 values

Example setup

Before 1st column sort

*FIG. 10A*

| Row | Col 2 | Col 1 | Col 0 |
|---|---|---|---|
| 6 | 20 | 18 | 21 |
| 5 | 19 | 17 | 16 |
| 4 | 15 | 13 | 14 |
| 3 | 9 | 11 | 12 |
| 2 | 7 | 8 | 10 |
| 1 | 5 | 6 | 3 |
| 0 | 1 | 4 | 2 |

A odd : 7 values
B odd: 7 values
C odd: 7 values

After 1st column sort
Before 1st serpentine row sort

*FIG. 10B*

| Row | Col 2 | Col 1 | Col 0 |
|---|---|---|---|
| 6 | *21* | *20* | 18 |
| 5 | 16 | 17 | 19 |
| 4 | 15 | 14 | *13* |
| 3 | 9 | 11 | *12* |
| 2 | 10 | 8 | *7* |
| 1 | 3 | 5 | 6 |
| 0 | 4 | 2 | 1 |

A odd : 7 values
B odd: 7 values
C odd: 7 values

Example after 1st serpentine row sort

Before 2nd column sort

Max, min already known
Col 1 already known

*FIG. 10C*

| Row | Col 2 | Col 1 | Col 0 |
|---|---|---|---|
| 6 | *21* | *20* | 19 |
| 5 | 16 | 17 | 18 |
| 4 | 15 | 14 | *13* |
| 3 | 10 | 11 | *12* |
| 2 | 9 | 8 | *7* |
| 1 | 4 | 5 | 6 |
| 0 | 3 | 2 | 1 |

A odd : 7 values
B odd: 7 values
C odd: 7 values

Example final serpentine fully sorted order

After 2nd column sort

*FIG. 10D*

| Row | Col1 | Col0 |
|---|---|---|
| 3 | A_03 | A_02 |
| 2 | A_01 | A_00 |
| 1 | B_02 | B_03 |
| 0 | B_00 | B_01 |

*FIG. 11A*

| Row | Col1 | Col0 |
|---|---|---|
| 3 | In_7 | In_6 |
| 2 | In_5 | In_4 |
| 1 | In_2 | In_3 |
| 0 | In_0 | In_1 |

*FIG. 11B*

TOP DOWN MERGE SORT METHOD AND APPARATUS

CROSS-REFERENCE TO RELATED APPLICATIONS

This application claims priority to and the benefit of the filing of U.S. Provisional Patent Application No. 63/593,707, entitled "Slide Merge Sorting Method and Apparatus", filed on Oct. 27, 2023, and the specification and claims thereof are incorporated herein by reference.

BACKGROUND OF THE INVENTION

Embodiments of the present invention generally relate to merging 2 or more sorted input lists of values into a single sorted output list. The overall set of operations required to merge 2 or more sorted input lists into a single sorted output list is generally referred to herein as a sorting process. Each such merge process is preferably configured to be implemented in hardware, and such a hardware sorting device is an example of a sorting network. One advantage of a hardware sorting network is that many sorting operations can easily be executed in parallel. The particular sorting networks disclosed in this application are generally referred to as Top Down Merge Sort ("TDMS") networks. The TDMS structure and sorting operation will be described using Hardware Description Language ("HDL") modules or their equivalent.

In a manner similar to that used with several existing sorting networks, a TDMS device preferably inputs or otherwise receives 2 or more one-dimensional ("1-D") sorted lists, that are mapped into a two-dimensional ("2-D") array. Several sets of fixed sorting operations are applied, first to this initial input 2-D array, and then to a sequence of identically-sized arrays, each of which is the output 2-D array produced by a set of sorting operations on the set's input 2-D array. In the final sorting operation output 2-D array, the values in the array are in sorted order, and are then easily mapped into the final 1-D sorted output list.

What initially sets TDMS networks apart from existing sorting networks is the manner in which the input list values are mapped into the initial 2-D array. Because of this unique mapping, the sets of sorting operations performed on the sequence of 2-D arrays also tend to be unique, and fewer of these sorting operation sets are needed, versus existing sorting networks.

Top Down Merge Sort networks are preferably hard-wired in the target hardware, such as in field-programmable gate arrays ("FPGAs"). The implemented merge process is therefore data-oblivious. In other words, all of the sorting operations are predefined, and are independent of the input values. Although Top Down Merge Sort networks are targeted to be used in hardware, they can also optionally be used in software applications where data-oblivious sorting and merging are desired.

Hardware Top Down Merge Sort networks are defined most simply in asynchronous combinatorial logic, which uses no clocking internally in the network. In this case, the input values directly propagate through the internal logic to their correct port locations in the sorted output list.

Top Down Merge Sort networks can also be easily implemented in a synchronously clocked configuration. When implemented in a clocked, synchronous system, TDMS networks can also be operated in a fully pipelined manner. In a fully pipelined system, a new set of inputs is applied in each clock cycle, and a new set of outputs is read out in each clock cycle. Depending on list size, several clock cycles can be required to complete the merge sort of each set of inputs.

Single-stage 2-sorters have traditionally been used to sort 2 values in hardware, and these simple devices will continue to be unchallenged when only sorting 2 values. When sorting more than 2 values in hardware, sorting networks featuring 2-way merge processes have typically been used. Traditional sorting network devices implement a multistage sorting process with 1 or more 2-sorters operating in parallel in each stage.

The most popular of these traditional sorting networks continue to be Kenneth Bacher's two sorting networks, both of which use multistage 2-way merge processes. One sorting network algorithm is an Odd-Even Merge Sort. The other algorithm is Bitonic Merge Sort.

FIGS. 1A and 1B illustrate the setups for these two sorting networks in a 2-column array, prior to the start of the sorting process. To aid in differentiating the two lists, the cells for the A list are in bold font, with a background of thin hatch lines. The B list cells have a white background, and bold font is not used.

In both FIGS. 1A and 1B, the values from the two separate sorted lists are placed into separate columns, in an initial sorted order. The A_07 value in each list is the maximum value of column ("Col.") 1 and the A_00 value is the minimum value in Col. 1. Likewise, the B_07 value is the maximum value of Col. 0 and the B_00 value is the minimum value in Col. 0.

For Odd-Even Merge Sort, illustrated in FIG. 1A, the initial sorted order is the same for both lists, with the maximum value at the top and the minimum value at the bottom of each list's column. For Bitonic Merge Sort, illustrated in FIG. 1B, the sorted order is reversed in the right B column, versus the order in the left A column. For both sorting processes, each of the 2-value rows in the 2-D array will be sorted in parallel in the first stage of the merge sorting process.

Although not illustrated here, both of the two algorithms require 4 sequential stages to merge the 2 sorted lists of 8 values into a single sorted list of 16 values. If only the maximum ("max") and minimum ("min") of the 16 values are of interest, it should be easy to see that both the overall max and overall min values will be determined after the first row sort stage of Odd-Even Merge Sort, in FIG. 1A.

It is probably more difficult to see that, after the row sort stage of Bitonic Merge Sort, whose setup is illustrated in FIG. 1B, the values are separated into an upper group (see the left column), and a lower group (see the right column). In fact, in each stage of Bitonic Merge Sort, groups of values are separated into an upper subgroup and a lower subgroup. In the last stage of Bitonic Merge Sort, there are only 2 values in each group, and the parallel upper/lower sort processes produce a fully sorted list of all of the original input values.

FIG. 1C illustrates a TDMS final setup array for the same 2 sorted input lists presented in FIGS. 1A and 1B. The FIG. 1C array, like the arrays in FIGS. 1A and 1B, is a 2 column 2-D array, but the data organization in the array is clearly different. The A values are placed into rows above the B value rows, thus inspiring the "Top Down" phrase. In this embodiment, the A rows have max values on the left and min values on the right. The B rows have a reversed order, with the max values on the right and the min values on the left. The setup methodology that is preferably used to produce this embodiment setup, as well as all TDMS embodiment setups, will be described in later sections of this disclosure.

As mentioned above, the row order of the B list in FIG. 1C is the reverse of the A list row order. This type of TDMS embodiment, where the initial placement row order of a list is the reverse of the order for the previous list is called an Order Reversed Merge Sort ("ORMS") embodiment. Other types of TDMS embodiments will be described further on in this disclosure.

When merging 2 sorted input lists, the TDMS network embodiments of the present invention, versus known sorting networks, require fewer sorting phases to merge the sorted input lists into a single sorted output list. For example, each of the known sorting networks of FIGS. 1A and 1B require 4 sorting phases in order to merge 2 lists with 8 values in each list. The FIG. 1C equivalent TDMS network embodiment of the present invention requires only 2 sorting phases to merge those same 2 lists.

Embodiments of the present invention provide a technology-based solution that overcomes existing problems with the current state of the art in a technical way to satisfy an existing problem for performing a merge sorting operation in fewer steps. An embodiment of the present invention is necessarily rooted in computing system technology in order to overcome a problem specifically arising in the realm of computers and other computational and/or data-processing hardware. Embodiments of the present invention achieve important benefits over the current state of the art, such as improving the operating efficiency of data processing, thus allowing more data to be processed in less time.

BRIEF SUMMARY OF EMBODIMENTS OF THE PRESENT INVENTION

Embodiments of the present invention relate to a method for sorting and merging lists of values with a semiconductor, the method including numerically sorting values of input lists, creating an input array having a number of columns and a number of rows, wherein the number of columns is at least equal to the number of input lists and wherein the number of rows is at least enough to hold all of the values of the sorted input lists, and wherein the input array is populated such that it comprises a largest value of a first input list disposed in a first row and first column of the input array, with any remaining values of the first sorted list disposed in successive cells of the input array in row-major fashion in a first direction and is populated with a largest value of a second input list disposed in a first open cell of a second column with any remaining values of the second sorted list disposed in successive cells of the input array in a row-major fashion in the first direction, the method further causing the values contained in the input array to be input into input busses of a semiconductor such that values from the input array are input into input buses of the semiconductor, the semiconductor sorting the columns of the input array such that the values contained therein are in a descending numerical order, the semiconductor sorting the rows of the input array, and the semiconductor outputting a sorted output of the values on a plurality of output buses of the semiconductor.

The semiconductor sorting the rows of the array can include the semiconductor performing straight row sorting of the rows of the array and/or the semiconductor performing serpentine row sorting of the rows of the array. Numerically sorting input lists can include numerically sorting three input lists and the input array can include five columns and wherein the remaining values of the first sorted list and the second sorted list are each disposed in a respective three successive columns of the input array. A largest value of a third input list can be disposed in a first open cell of a third column with any remaining values of the third sorted list disposed in successive cells of the input array in a row-major fashion in the first direction. The method can also include the step of manipulating cell locations of the input array before the semiconductor sorts the columns and the rows, wherein manipulating cell locations can include moving values from a fourth column of the input array over to a first column of the input array; and moving values from a fifth column of the input array over to a second column of the input array. The method can also include shifting values within each of the first column, the second column, and the third column to fill imbedded open cells with values and removing any rows containing only empty cells.

In the method, the first row can be a top row or it can be a bottom row. Likewise, the first column can be a leftmost column or a rightmost column. Numerically sorting input lists can include numerically sorting more than two input lists and for each input list after the second input list, a first value thereof can be input into a column of the input array which is adjacent to a column where the first value of an immediately preceding list was input. The method can also include manipulating cell value locations of the input array before sorting columns and sorting rows. Optionally, manipulating cell value locations can include shifting values of cells within at least some of the columns such that all values of all lists are disposed within only a subset of the columns. Sorting rows of the input array can include serpentine sorting such that a maximum value of each even row is positioned at a first end thereof and sorting odd rows such that a maximum value of each odd row is positioned at an end opposite the first end. The semiconductor sorting the columns of the input array can include the semiconductor sorting columns by applying an output of a comparison block to select line inputs of a plurality multiplexers. The method can also include using the outputs of a plurality of lookup tables as inputs for the plurality of multiplexers.

Embodiments of the present invention also relate to a method for sorting and merging lists of values with a semiconductor that includes numerically sorting values of input lists, creating an input array having a number of columns and a number of rows, wherein the number of columns is at least equal to the number of input lists and wherein the number of rows is at least enough to hold all values of the sorted input lists, and wherein the input array is populated with a largest value of a first input list disposed in a first row and first column of the input array, with any remaining values of the first sorted list disposed in successive cells of the input array in row-major fashion in a first direction and a largest value of a second input list is disposed in a first open cell of a second column with any remaining values of the second sorted list disposed in successive cells of the input array in a row-major fashion in a direction that is opposite that of an immediately preceding list, causing the values contained in the input array to be input into input buses of the semiconductor, the semiconductor sorting the columns of the input array such that the values contained therein are in a descending numerical order, the semiconductor sorting the rows of the input array, and the semiconductor outputting a sorted output of the values on a plurality of output buses of the semiconductor.

The method can include sorting the rows of the array using straight row sorting. The semiconductor sorting the columns of the input array can include the semiconductor sorting columns by applying an output of a comparison block to select input lines of a plurality of multiplexers. The method can also include using the outputs of a plurality of lookup tables as inputs for the plurality of multiplexers.

Embodiments of the present invention relate to TDMS networks which merge 2 or more sorted input lists into a single sorted output list. The number of sorted input lists is termed Nlists. The primary purpose in using TDMS networks is to reduce or otherwise minimize the number of sorting operation phases and therefore the time required to merge the Nlists input lists into the single sorted output list. Another reason for using TDMS networks is that they easily deal with input lists which have differing numbers of list values.

In a TDMS network of the present invention, the values from the 1-D sorted input lists are mapped into a final setup array. The details pertaining to how a TDMS final setup array is constructed are covered in the Detailed Description section of this application. The final setup array is then the input to the hardware that implements the Top Down Merge Sort process. The output of the TDMS process is preferably an identically-sized 2-D array, with the values in the array now in sorted order. The values in this final sorted 2-D array are preferably then mapped into matching sorted order locations in the 1-D single sorted output list.

A TDMS final setup array is preferably a 2-D array and preferably contains Ncols columns, ranging from Col 0 at the right of the array, to Col Ncols−1 at the far left of the array. A TDMS final setup array preferably contains Nrows rows, ranging from Row 0 at the array bottom to Row Nrows−1 at the top of the array. Of course these row and column naming conventions are merely for providing simplicity to facilitate the reader in better understanding the embodiments of the present invention. These naming conventions are not to be interpreted as somehow limiting the invention as other naming conventions can also be used and will provide desirable results (for example, instead of reference being made to "Row 0 and Nrows−1", a user could instead choose to call these "Row 1 and Nrows").

In several embodiments, the output sorted order of a fully sorted TDMS 2-D array is preferably a simple row-major order, which begins with the minimum value located at the bottom right of the 2-D array, at Row 0, Col 0. In Row 0, and all rows, final output sorted values range from the maximum at the left column, Col Ncols−1, to the minimum at the right column, Col 0. All values in a row are greater than or equal to any value in a lower row. This type of final 2-D output sorted order is shown in FIGS. 1D and 2D. The ORMS embodiments briefly mentioned above are preferably configured to have this type of simple row-major sorted output order.

In several embodiments, the output sorted order of a fully sorted TDMS 2-D array is preferably a row-major serpentine order, which begins with the minimum value located at the bottom right of the 2-D array, at Row 0, Col 0. In Row 0, and all even rows, sorted values range from the maximum at the left column, Col Ncols−1, to the minimum at the right column, Col 0. The row sorted order in Row 1 and all odd rows is preferably reversed, with the row values ranging from the maximum at Col 0 to the minimum at Col Ncols−1. A set of embodiments which will be defined later in detail, called Slide Merge Sort ("SMS") embodiments, are preferably configured to use this row-major serpentine 2-D output order.

In embodiments with a row-major serpentine final sorted order, like the embodiments with a simple row-major final sorted order, the lowest sorted order array values are found in Row 0, and the highest values are found in Row Nrows−1. The values in each row are greater than or equal to all values in any lower row.

The sorting process implemented in the Top Down Merge Sort hardware preferably comprises a sequence of sorting operation phases, each of which operates on values from an input 2-D array, and each of which writes the values from its phase sorting operations into an identically-sized output 2-D array. All phase sorting operations preferably operate on sort groups, which preferably includes array locations defined in the input 2-D array, and identically defined array locations in the output 2-D array. The sort group input locations provide the input values for the sort group's sort operation. After those values are sorted, they are placed in sorted order into the sort group locations in the phase output 2-D array.

In several TDMS embodiments, the final setup array is the input 2-D array to the first phase. The output 2-D array of a phase, except for the last phase, becomes the input array of the next sorting phase. The output 2-D array of the last phase is in sorted order, and its values are preferably then directly mapped into the final 1-D sorted output list. All TDMS sorting phase 2-D arrays are preferably sized identically to the TDMS final setup array.

There are three types of phases:
1) a column sort phase, in which the values in each sort group are found in the same column.
2) a row sort phase, in which the values in each sort group are found in the same row.
3) a hybrid phase, in which the values in each sort group may include values from 2 adjacent rows, comprising a set of the lowest contiguous values in the upper row, and a set of the highest contiguous values found in the lower row.

In several embodiments, TDMS sorting processes preferably start with a column sort phase, followed by a row sort phase. For TDMS processes that include additional phases, column sort phases preferably alternate with row sort phases, until the values in the final phase output 2-D array are in sorted order.

TDMS column sort phase operations are preferably performed in accordance with the overall sorted order. In several embodiments, for example, the maximum value is preferably placed into the uppermost sort group location in the output array column, the remaining values placed in nonincreasing order down the set of column locations, ending with the minimum value placed in the lowermost sort group column location in the output 2-D array. This is illustrated in several figures-see for example FIGS. 1D, 2B-2D, and FIGS. 9, 10A-10D. After sorting a group of values selected from a sort group's set of column locations in the input 2-D array, the sorted values are preferably placed into the same set of column locations in the output 2-D array.

TDMS row sort phase operations are preferably performed in accordance with the sorted row order in the overall TDMS 2-D array output sorted order. In several embodiments, for example, the overall sorted row order is the same for all rows, ranging from the max value at the left Ncols−1 column to the min value at Col 0, as illustrated in FIGS. 1D and 2C-2D. In other embodiments, the overall serpentine sorted row order for even rows also ranges from the max on the left to the min on the right, but the sorted row order for odd rows ranges from the max on the right to the min on the left, as illustrated in FIGS. 9, and 10B-10D.

All phase sorting operations are preferably performed in parallel. Any input value not involved in a phase sorting operation is passed through directly from its input 2-D array location to the identical location in the phase output 2-D array.

The number of phases required to sort using TOMS hardware depends on the Nlists number of sorted input lists to be merged. The minimum number of input lists is 2, and a 2-way merge of 2 sorted input lists, in a 2-column array, requires only 2 phases to fully merge the 2 lists, an example of which is illustrated in FIGS. 2A-2D.

In the first phase operation for the 2-way merge process applied to FIG. 1C, each of the two columns is fully sorted. This is illustrated for an example set of A and B list values in FIGS. 2A and 2B. The second and final phase for the FIG. 1C merge sort preferably includes sorting each row of the 2B/2C first phase output array in accordance with the simple row-major sorted row order. This is illustrated for the example values in FIG. 2C, with the final set of sorted values illustrated in FIG. 2D. The fact that any 2 sorted lists can be completely merged in only 2 operational phases is what makes the TDMS sort of 2 sorted input lists extremely simple and efficient.

As mentioned previously, the TDMS method and system is focused on reducing the number of phases and time required to merge the sorted input lists into a single sorted output list. The 2-D array setup for these networks is configured so that, in the first column sort phase, the array cell values move to or close to the final row that those values will end up in. For the 2-column, 2-way merge process, array values do move to the final row that those values will be found in, as illustrated in FIG. 2. In the second phase, the row sort phase, also illustrated in FIG. 2, only parallel single-stage 2-sorter operations are then required to produce the final fully sorted output list order.

When TDMS is used to merge more than 2 sorted input lists, more than 2 merge phases are used. But the initial column sort phase does move array values close to the row where those values will be located in the final sorted order. As illustrated in FIGS. 10A-10D for an Nlists=3 TDMS, each value is within 1 row of its final row in the overall serpentine sorted order, after the initial column sort shown in the transition from 10A to 10B. The TDMS sorting operation process for Nlists>2 is still quick and efficient. The details of the setup and operation for all TDMS networks are covered in the Detailed Description section.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more embodiments of the invention and are not to be construed as limiting the invention. In the drawings:

FIG. 1A is a drawing which illustrates a known odd-even merge sort 2 column setup wherein 8 value sorted input lists A and B are used;

FIG. 1B is a drawing which illustrates a known bitonic merge sort 2 column setup wherein 8-value sorted input lists A and B are used;

FIG. 1C is a drawing which illustrates a 2 column (Nlists=2), TDMS setup according to an embodiment of the present invention, wherein 8-value sorted input lists A and B are used;

FIG. 1D is a drawing which illustrates a 2 column final output sorted order as a result of the TDMS for the 16 A and B list values listed in row-major order across the two columns;

FIG. 2A is a drawing that illustrates an example of an initial setup of a TDMS 2 column array (Nlists=2), wherein 8-value sorted input lists A and B are provided;

FIG. 2B is a drawing which illustrates the example of FIG. 2A, wherein each column is being sorted in a vertically descending order with the largest value of each column at the top thereof according to an embodiment of the present invention;

FIG. 2C is a drawing which illustrates the example of FIGS. 2A and 2B after columns have been sorted and wherein each row is now to be sorted;

FIG. 2D is a drawing which illustrates the example of FIGS. 2A-2C, after the rows have been sorted such that the data is now sorted across the two columns in a row-major configuration;

FIG. 3A is a drawing which illustrates an initial setup of a TDMS 2 column array (Nlists=2) wherein an even number of entries are contained in list A, but an odd number of entries are contained in list B;

FIG. 3B is a drawing which illustrates a final setup of the TDMS example of FIG. 3A;

FIG. 4A is a drawing which illustrates an initial setup of a TDMS 2 column array (Nlists=2) according to an embodiment of the present invention wherein the A list has an odd number of values while the B list has an even number of values;

FIG. 4B is a drawing which illustrates how unpopulated cells in FIG. 4A slide to the bottom of their respective columns, replaced by populated cells which slide up the column;

FIG. 4C is a drawing which illustrates the final setup of the TDMS of FIGS. 4A-4B;

FIG. 5A is a drawing which illustrates an initial setup of a TDMS 2 column array (Nlists=2) according to an embodiment of the present invention wherein an odd number of entries are contained in list A and wherein an even number of entries are contained in list B;

FIG. 5B is a drawing which illustrates how unpopulated cells in FIG. 5A slide to the bottom of their respective columns, replaced by populated cells which slide up the column;

FIG. 5C is a drawing which illustrates an array with at least one fully unpopulated row at the bottom of array, which must be removed;

FIG. 5D is a drawing which illustrates a final setup for the example of FIGS. 5A-5C after the rows of empty cells have been removed;

FIG. 6 is a drawing which illustrates an example of a TDMS 2-way final setup according to an embodiment of the present invention wherein there are three columns (Nlists=3) containing two lists, each with 9 values;

FIG. 7 is a drawing which illustrates an example of a TDMS 2-way final setup according to an embodiment of the present invention wherein there are four columns (Nlists=4) containing two lists, each with 8 values;

FIG. 8A is a drawing which illustrates an example of an initial setup for an SMS according to an embodiment of the present invention wherein there are five initial columns containing three lists (Nlists=3), each with 7 values, with a first list beginning on a first column, a second list beginning on a second column and a third list beginning on a third column, and wherein each list is input into only 3 columns;

FIG. 8B is a drawing which illustrates the example of FIG. 8A after values to right of the Col 0 right edge slide Ncols=3 columns to the left;

FIG. 8C is a drawing which illustrates how unpopulated cells in FIG. 8B slide to the bottom of their respective columns, replaced by populated cells which slide up the column;

FIG. 8D is a drawing which illustrates the example of FIGS. 8A-8C which illustrates the final setup where unpopulated rows have been removed;

FIG. 9 is a drawing which illustrates an arrangement of data in an SMS 3 column array (Nlists=3) which is in a final sorted output order;

FIG. 10A is a drawing which illustrates an example of an SMS 3 column array (Nlists=3) after initial setup and before the columns have been sorted according to an embodiment of the present invention;

FIG. 10B is a drawing which illustrates the example of the SMS of FIG. 10A after the columns have been sorted but before a serpentine row sort has been performed;

FIG. 10C is a drawing which illustrates the example of the SMS of FIGS. 10A and 10B after the rows have been sorted but before the edge column sort has been performed;

FIG. 10D is a drawing which illustrates the example of the SMS of FIGS. 10A-10C after the column edge sort indicated in FIG. 10C has produced the final serpentine output sorted order;

FIG. 11A is a drawing which illustrates a final 4 row, two column array.

FIG. 11B is a drawing which illustrates the array of FIG. 11A wherein the cells have been relabeled to be of a like kind and in a consecutive order;

DETAILED DESCRIPTION OF THE INVENTION

Figure 12:
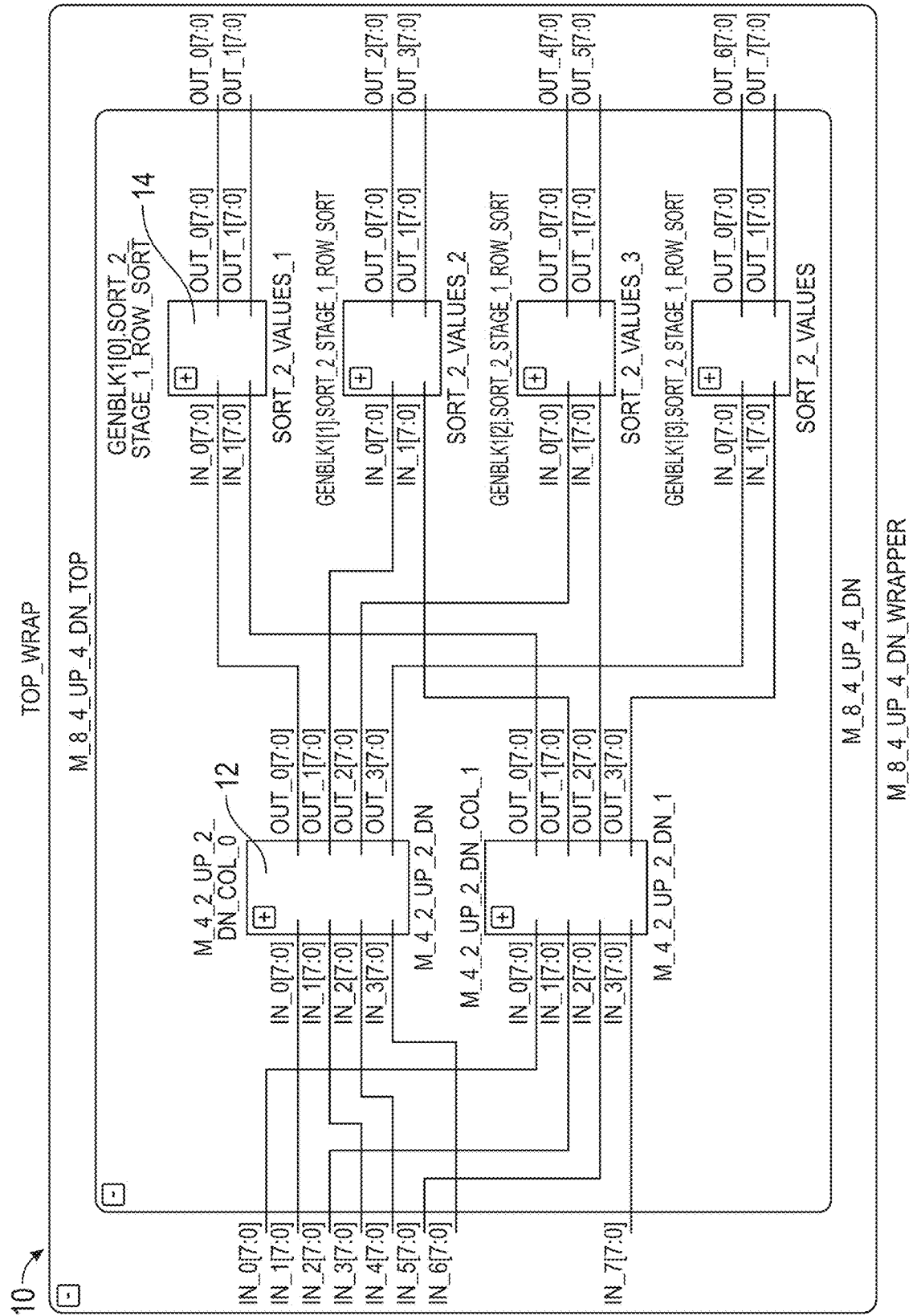
FIG. 12 is a drawing which illustrates a FPGA layout that implements the final array setup of FIG. 11B.

As used throughout this application, the following terms have the indicated meanings:

Single-stage sorting device—The simplest hardware sorting device, which includes one set of inputs, one set of outputs, and whatever internal logic is used to transfer the input values to the output ports in sorted order.

Stage—The most elementary portion of a sequential sorting process, in which all sorting operations are performed in parallel by single-stage sorting devices.

Phase—A portion of a sequential sorting process on a 2-D array of values, in which each sorting operation is performed on a sort group of values, with each group limited to:
values in the same column in the array (column sort phase), or to
values in the same row in the array (row sort phase), or to
lowest values in a row and the highest values in the next lowest row (hybrid sort phase).

Sorting network—A multistage sorting device that produces a fully sorted output list from a set of unordered inputs, or from 2 or more sorted input lists.

Nlists—The number of sorted input lists in a merge sorting network.

Ncols—The number of columns in a 2-D array of values.

Nrows—The number of rows in a final setup of a 2-D array.

Nrightslide—In SMS network setup, the number of columns that each list 2-D array initially slides to the right, relative to the 2-D array of the preceding list.

Standard SMS Setup Array—An SMS network configuration in which Ncols=Nlists, and Nrightslide=1.

Rem_div_Ncols—The integer remainder when the length of an SMS input list is divided by Ncols.

General Methodology for Creating a Final Setup Array for Top Down Merge Sort Networks. Top Down Merge Sort networks merge Nlists sorted input lists into a single sorted output list. The methodology of these networks can include the construction of a final setup array, containing all of the values of the sorted input lists, and a sequence of sorting phases, which process this initial setup array into a sorted output 2-D array.

Order Reversed Merge Sort ("ORMS") final setup array, prior to any sorting operation phases. In the construction of an ORMS final setup array, an Ncols 2-D array is preferably constructed by assigning the first A list values to the top rows of the array, in a predetermined sorted row-major order. The predetermined sorted row-major order for several ORMS embodiments consists of the row values ranging from the max value on the left edge of the row to the min value on the right edge of the row, for all rows. For several embodiments, the highest list values are placed in the highest rows occupied by the list, with the values in each row greater than or equal to any value in a lower row. If there are any unoccupied cells in the A list, they are placed after the minimum A list value. For example, for embodiments with row placement order ranging from the max row value on the left, unpopulated cells will be placed in the rightmost cells of the row containing the A list min, as illustrated in FIGS. 4A and 5A. The second list B values are preferably placed in the array rows immediately below the A list rows. The placement row order of the B values is opposite to that of the A list values. Thus, in the examples of FIGS. 4A and 5A, for the B list, the row max is placed in the right row cell, with the values descending down to the row min in the leftmost row cell. For the B list, the highest list values are placed in the highest rows occupied by the list, with the values in each row greater than or equal to any value in a lower row. Any unpopulated cells in the B list rows will be placed below the B list min value, for example, to the left of the min B list value, as illustrated in FIGS. 3A and 5A. After the B list rows are populated, any array unpopulated cells slide to the bottom of the array, replaced by array values sliding up, as illustrated in FIGS. 5A-5B. Any fully unpopulated rows are then removed, as illustrated in FIGS. 5C-5D, producing the final ORMS setup array. Final ORMS setup arrays are illustrated in FIGS. 1C, 3B, 4C, 5D, 6, and 7. ORMS requires only 2 phases for its 2-way merge sorting process.

As used throughout this application, the A list can also be described as a first list and the B list can also be described as a B second list and any further lists can be regarded as a subsequent list—although, the "first" and "second" notation does not require that the lists be input into the array in that order.

Slide Merge Sort (SMS) final setup array, prior to any sorting operation phases. In the construction of an SMS final setup array, an Ncols 2-D array is preferably constructed by assigning the first A list values to the top rows of the array, in a predetermined sorted row-major order. The predetermined sorted row-major order for several embodiments consists of the row values ranging from the max value on the left edge of the row to the min value on the right edge of the row, for all rows. For several embodiments, the highest list values are placed in the highest rows occupied by the list, with the values in each row greater than or equal to any value in a lower row. If there are any unoccupied cells in the A list rows, they are placed below the minimum A list value, for example, to the right of the min value in the lowest list row, as illustrated in FIG. 8A. The A list preferably begins in the left, top, and continues for the predetermined Ncols number of columns before continuing again on a subsequent row of the final 2-D array, as illustrated in FIGS. 8A-8D. The initial placement of any additional list, after the A list, matches the A list placement, except that the placement of each additional list begins on the next empty row and slides to the right by Nrightslide columns. This is illustrated in FIG. 8A, in which Nrightslide=1. Each subsequent list is placed into the array rows immediately below the rows occupied by the previous list. After the placement of lists into the initial SMS, all columns of data to the right of the Col 0 right edge slide left by Ncols columns, as illustrated by the Ncols=3 left slides of data illustrated in the transition from FIG. 8A to 8B. After the left slide, any unpopulated cells in the array slide in the same column towards the bottom row, replaced by populated cells sliding up in the same column, as illustrated in the transition from FIG. 8B to 8C. After this vertical slide step, any fully unpopulated rows at the bottom of the array are removed, as illustrated in the transition from FIG. 8C to 8D. After the row removal step, the SMS final setup is complete, as illustrated in FIG. 8D.

The steps in the construction of a TDMS final setup array described above simply map input list locations into locations in the final setup array. The steps of inputting the data from the lists into the 2-D array all happen prior to the start of any sorting process (i.e. before Time=0). After the data from the input lists have been loaded into the array according to the TDMS final setup array, the resultant TDMS final setup array is ready for merge sort processing using the sorting phase hardware.

Operation of Top Down Merge Sorting Networks. The Top Down Merge Sort process preferably includes a sequence of phases, implemented by sort phase hardware. Each phase preferably takes data from cells within a 2-D input array and performs a merge and/or sorting operation and outputs the data into a phase output 2-D array. Each phase preferably includes performing one or more sorting operations on the phase input 2-D array, producing a more ordered phase output 2-D array. The first TDMS operation phase is a full column sort for each column in the input 2-D array. After sorting all values in a column, the sorted values are preferably placed ranging from the maximum at the top of the column to the minimum at the bottom of the column. The first TDMS operation preferably uses the final setup array as its input array.

This TDMS 1st column sort is itself often a merge sort. An example of this is illustrated in FIGS. 2A and 2B, which illustrates example values for the A and B lists in the array of FIG. 1C. In each column, 4 sorted values from List A are merged with 4 sorted values from List B in the 1st column sort. When Nlists=2, this column sort can be performed most quickly with a single-stage 2-way merge sorter.

In the second TDMS phase each row is fully sorted. In the output 2-D array from that phase, the sorted values are placed into row locations depending on the predefined sorted row order for that particular row. For example, as illustrated by the arrows in FIG. 2C, in this example, the predefined sorted row order for each particular row is a descending order from left to right. In an ORMS 2-D embodiment array, the predefined sorted row order is typically the same simple row-major order for each row, with the max row value placed in the leftmost row cell, and values placed in the row in a non-increasing manner down to the min value in the rightmost populated cell in the row. This type of row sorted order is shown in FIGS. 1D and 2D.

In an SMS 2-D array, the typical sorted row order is preferably a serpentine row order (wherein each subsequent row is sorted in an opposite direction from the row immediately preceding it). As illustrated in FIGS. 9 and 10D, in the bottom row (Row 0 in the FIGS.) and all even rows, the sorted row order ranges from the max value on the leftmost data cell of the row to the min value at the rightmost data cell of the row. In this configuration, in row 1, and all odd rows, the sorted row order ranges from the max value on the rightmost data cell of the row to the min value at the leftmost data cell of the row.

The results of the two ORMS sorting phases for the FIG. 2 example are illustrated in FIG. 2D. The 2-D array is in fully sorted order. Like the FIG. 2 example, any standard ORMS 2-way merge only requires the full column sort phase followed by the full row sort phase in order to fully merge sort the 2 sorted input lists.

When there are more than 2 sorted lists to be merged, a standard SMS network 2-D array has more than 2 columns, and additional sorting phases are needed after the first 2 sorting phases. Any additional phases preferably alternate between a column sort phase and a row sort phase, starting with a column sort phase as the 3rd overall sorting phase. When there are more than 2 sorted lists to be merged in a standard SMS network, a column sort phrase can be replaced by a hybrid phase, as needed.

After the first 2 SMS sorting phases, a column sort operation cannot be treated as a merge of sorted lists. The input sort group for each column sort operation is assumed to be completely unordered. Also, a column sort group usually will not include all values in the column. For example, after the 1st row sort, the highest 2 values in overall sorted order have already been determined and are in their final 2-D array locations. Likewise, for a fully populated standard SMS network, the lowest 2 values in overall sorted order have been determined and are in their final 2-D array locations. No phase input array location that already contains its final value will be involved in a sorting operation for that phase or any subsequent phase.

The sorted order of each column sorting process preferably continues to be in accordance with the SMS 2-D array final sorted order. The maximum sorted value from a column sort group is preferably placed in the output array sort group top column location, and the uniformly non-increasing values range down the sort group column locations, with the minimum value placed in the output array sort group bottom column location.

If there are 1 or more unpopulated cells in a sort group of cells, the unpopulated cells are placed at the row or column locations where the minimum values will otherwise be placed. Each sort group sorted output list will then contain a continuous set of populated cells, and then possibly contain a continuous set of 1 or more unpopulated cells below the minimum populated cell location.

ORMS 2-way Merge of Nlists=2 Sorted Input Lists: Ncols=2. Several ORMS 2-way merge network embodiments are preferably implemented using a 2 column array, i.e., with Ncols=2. The simple ORMS array construction for the merge of two even lists in a 2 column array is illustrated in FIG. 1C. Although both lists have 8 values in FIG. 1C, the setup methodology does not require that both lists have the same length, only that both list lengths are even. Another way of saying that both lists are even is to say that both lists have the same rem_div_2 value of 0. In other words, when an even number is divided by the Ncols value of 2, its integer remainder is 0.

In several embodiments, when Nlists=2, Order-Reversed Merge Sort, has 2 phases:
1) a 1st column sort phase; and
2) after the column sort phase, a 2nd row sort phase.

For a 2-way merge, when there are Nlists=2 sorted input lists, each column sort is preferably performed with a Single-stage 2-way Merge Sorter.

When there are 2 columns, the row sorts are preferably performed by 2-sorters, which can include single-stage devices that have been known and used for other sorting operations for decades. When there are more than 2 columns, (i.e. N columns), the fastest row sorts will be performed with the single-stage N-sorters as described in U.S. Pat. Nos. 11,360,740, and/or 12,093,663 which are incorporated herein by reference. Most preferably, each phase is completed using one set of single-stage devices. Otherwise, a multistage set of operations is used for each phase.

FIG. 3A illustrates the ORMS array definition methodology when the first A list has an even number of values, and the second B list has an odd number of values. In this case, the last cell in the list B array will be an unpopulated cell in Col 1. Because the unpopulated cell is already found at the bottom of the array after the initial 2-D array definition, no vertical slide step is needed.

FIG. 4A illustrates the ORMS setup methodology opposite to that of FIG. 3A, with the first A list having an odd number of values and the second B list having an even number of values. The last cell in the list A array will be an unpopulated cell.

In FIG. 4A, the unpopulated cell is at the top of Col 0 after the initial ORMS 2-D array setup. Because of this, a vertical slide in Col 0 is needed, as shown in FIG. 4B, to slide the unpopulated cell down to the bottom of its column. FIG. 4C illustrates the final array setup for this odd/even list order, with the unpopulated cell now at the bottom of Col 0.

FIG. 5A illustrates the ORMS setup methodology when both lists have an odd number of values, i.e., both lists have a rem_div_2 value of 1. Each list 2-D array has one unpopulated cell, as illustrated in FIG. 5A. As shown in FIG. 5A, the two unpopulated cells are in separate columns. In FIG. 5B, the unpopulated cell in Col 0 slides to the bottom row of the array, where the Col 1 unpopulated cell is already located. The fully unpopulated row shown in FIG. 5C is then removed in FIG. 5D, producing the final setup array for the ORMS for these two lists.

All 4 of FIGS. 1C, 3, 4, and 5 arrays only require 2 operational phases in their sorting networks. This was mentioned earlier and is illustrated in FIG. 2. The first sorting phase preferably includes full column sorts of each column. If one of the lists only contains one value, which is true for FIGS. 3 and 4, the column not containing the single-valued list is already sorted, so no column sort is needed for that column in phase 1.

Also, all 4 of the FIGS. 1C, 3A, 4A, and 5A arrays are templates for the final 2-D array setups of the 4 associated combinations of odd and even list lengths. Although each figure has specific list lengths, each figure illustrates how the final setup array is constructed for any two lists which have that specific odd/even combination.

ORMS 2-way Merge of Nlists=2 Sorted Input Lists: Ncols>2. FIGS. 1C, 3A, 4A, and 5A define initial 2-D array setups for 2-way, i.e., Nlists=2, ORMS embodiments when Ncols is also equal to 2. FIG. 6 illustrates a 2-way ORMS with Ncols=3. This ORMS embodiment is also fully sorted after a full column sort, followed by a full row sort. Once again, each column can be sorted with a single-stage 2-way merge sorter, and each row sort can be implemented with a single-stage 3-sorter.

FIG. 7 illustrates a 2-way ORMS with Ncols=4. This ORMS embodiment is also fully sorted after a full column sort, followed by a full row sort. Once again, each column can be sorted with a single-stage 2-way merge sorter, and each row sort can be implemented with a single-stage 4-sorter. The FIG. 7 embodiment offers an alternative way to solve the 2-way merge shown in FIG. 1C. As each column 2-way merge in FIG. 7 is smaller than each column 2-way merge in FIG. 1C, it is possible that the FIG. 7 device has some advantages versus the FIG. 1C device. However, the column sort advantages may be offset by the disadvantage that each FIG. 7 row sort is best solved by a single-stage 4-sorter, which is larger and slower than the 2-sorters which are used for the FIG. 1C row sort operations.

Standard SMS network 3-way Merge of Nlists=3 Sorted Input Lists: Ncols=3; Nrightslide=1. FIG. 8 illustrates how a merge of 3 lists, each with 7 values, is preferably set up for SMS operation. FIG. 8A illustrates the initial setup of the 3 list arrays. Each array has two unpopulated cells in its lowest row. FIG. 8B illustrates the setup after the left slide of the B and C array columns which are to the right of the Col 0 right are depopulated by sliding the data from lists B and C to the left. The setup status after the vertical slide of unpopulated cells to the bottom of the array is illustrated in FIG. 8C. The bottom two rows in FIG. 8C are fully unpopulated, so these rows are eliminated, producing the final setup array for this embodiment in FIG. 8D.

The SMS network operation for the 3-way merge of data as illustrated in FIG. 8 array is illustrated in FIG. 10. The first two phases are a full column sort of each column, as shown in FIG. 10A, followed by a full row sort of each row, shown in FIG. 10B.

After the first column sort phase for the 3-way merge, and for any SMS network setup, the two highest values are already in the top row. If the final setup array is fully populated, that is there are no unpopulated cells in the bottom row (Row 0), the two lowest values are already in Row 0. After the 2nd full row sort phase then, the two maximum and two minimum values will already be in their final locations, and those four locations will not need to be a part of any sort group in any additional phases.

The example set of 3-way merge values in FIG. 10A are the distinct values from 1 to 21. After the 2nd phase, the 1st row phase, the locations of the 21 values are illustrated in FIG. 10C. The highest 2 values, 21 and 20, as well as the lowest 2 values, 2 and 1, are in their final array locations, as illustrated in FIG. 10D.

When comparing FIG. 10C and FIG. 10D, note that all values in the middle column, Col 1, are also in their final sorted order locations, after the 1st row sort phase. Because of this, only values in the leftmost and rightmost columns need to be sorted in final 3-way merge phase, which is a column sort phase. As illustrated in FIG. 10C, the sorts for the edge columns are not full column sorts. Rather, groups of 2 values in the edge columns are sorted in parallel, using single-stage 2-sorters, the fastest single-stage N-sorters. This final phase is then a fast single-stage phase.

The lowest group of 2 values to sort are preferably selected from the left column, at rows 0 and 1, as shown in FIG. 10C. The next highest group of 2 values to sort are preferably selected from the right column, at rows 1 and 2. This alternating selection order preferably continues up the array, until the final group of 2 is chosen in the column opposite of the maximum value location, with the values selected from top row Nrows−1 and next row down Nrows−2.

Because all values in the middle column are in their final sorted locations after the first row sort phase, this means that the median of a fully populated SMS network setup array with Nrows odd is also known after the first row sort phase. If only the median value is desired in this case, then the final column sort phase is not needed. Furthermore, only the row containing the median values needs to be sorted in the first row sort phase. All other rows and their values can be ignored.

Standard SMS 4-way Merge of Nlists=4 Sorted Input Lists: Ncols=4; Nrightslide=1. Although not illustrated in the figures, the 4-way merge's third sorting phase, the second column sort phase, is similar to that of the 3-way merge illustrated in FIG. 10C. Only edge column values, in groups of 2, are sorted. No sorting is used for the middle 2 columns. However, the 4-way merge needs another sort phase, a row sort phase, after the 2nd column sort phase.

In the 4-way merge's fourth and final overall phase, its second row sort phase, all rows except the top and bottom rows are fully sorted. As the max and min 2 values are already determined, and correctly located, only one 2-sorter operation is required in each of the top and bottom rows, in order to fully sort those 2 rows.

Standard SMS 5-way Merge of Nlists=5 Sorted Input Lists: Ncols=5; Nrightslide=1. In the 5-way merge's third sorting phase, the second column sort phase, the edge column sort groups contain all values except the already known overall max and min values, in the top and bottom rows. However, the columns next to the edge columns, Col Ncols−2 on the left and Col 1 on the right, preferably use the 2-sorter operations illustrated for the 3-way edge columns in FIG. 10C. The middle column, Col 2, does not need to be sorted.

As with the 4-way merge, the 5-way merge has one more sort phase, the second row sort phase. This fourth and last phase is similar to the last phase of the 4-way merge. All rows except the top and bottom rows are fully sorted. As the top and bottom rows each have 2 values that are in their final sorted locations, only 3-sorters are needed in those two rows to fully sort each row.

Standard SMS 6-way Merge of Nlists=6 Sorted Input Lists: Ncols=6; Nrightslide=1. The 6-way merge has 5 total sorting phases, the last phase being the third column sort phase. This last column sort phase is like the last column sort phase for the 3-way merge illustrated in FIG. 10C. Only the edge columns, in groups of 2, are sorted. The 4th sorting phase, the second row sort phase, is like that of the 4-way and 5-way merge fourth phases. All rows except the top and bottom rows are fully sorted. The row sorts in top and bottom rows do not include the 2 highest and 2 lowest values, because these values are already in their final sorted array locations.

TABLE 1

TDMS Sorting Operation Phases Required vs Nlists.

| Nlists | 1st Col Sort | 1st Row Sort | 2nd Col Sort | 2nd Row Sort | 3rd Col Sort | 3rd Row Sort |
|---|---|---|---|---|---|---|
| 2 | X | X | | | | |
| 3 | X | X | X | | | |
| 4 | X | X | X | X | | |
| 5 | X | X | X | X | | |
| 6 | X | X | X | X | X | |
| 7 | X | X | X | X | X | X |
| ... | X | X | X | X | X | X |
| 14 | X | X | X | X | X | X |

Nlists = 2 data is for ORMS embodiments;
Nlists > 2 data is for SMS embodiments

Standard SMS networks; 14>=Nlists>=7; Ncols=Nlists; Nrightslide=1. When 14≥Nlists≥7, 6 sorting phases are required to produce a fully sorted 2-D array. Some of these SMS phases will not require full column or row sorts, but the details are not given here. Table 1 summarizes the number of sorting phases required for Nlists=2 for ORMS embodiments, and Nlists ranging from 3 to 14 for SMS embodiments.

Breaking up TDMS sorting processes into 2 or more groups. As discussed above, a 4-way merge requires 4 sorting phases to produce a fully sorted 2-D array. The 4 sorted input lists can be broken up into 2 groups of 2 sorted lists. Each group requires 2 sorting phases to produce a 2-way single sorted output list for each group. Merging the two sorted output lists from each group requires 2 additional phases. In short, using a direct 4-way merge and merging the outputs of two 2-way merges both require 4 total phases. Each method can be analyzed for a given set of input lists, after which the best method to use can be determined.

Although a direct 8-way merge is not discussed in detail herein, it will require 6 total phases to fully merge the 8 sorted input lists. If the 8 input lists are broken up into 4 groups of 2 lists, the 8 lists can also be fully merged in 6 total phases using only 2-way merge processes. Once again, each method can be analyzed for the particular set of lists to be merged, and the best method chosen.

This concept can be repeated while it still may be needed and still makes sense. Although a 16-way merge is not discussed in detail herein, it will take 8 sorting phases. If broken up into 8 groups of 2 sorted lists, the 16 lists can also be merged in 8 sorting phases, using only 2-way merge processes.

Embodiments can also combine ORMS and SMS final setup arrays and resulting operations.

Insertion of Hardware Sorting Devices. TDMS sorting operation phase modules preferably connect 2-D input sort groups to the input ports of phase hardware sorting devices. After the hardware sorting device has correctly sorted its input values, the TDMS phase module connects the device's sorted output values to the sort group locations in the phase output 2-D array.

Embodiments of the present invention can be implemented in various hardware configurations and/or platforms, for example a TDMS device according to an embodiment of the present invention can be implemented via one or more of a field programmable gate array ("FPGA"), an application-specific integrated circuit ("ASIC"), an integrated circuit that is manufactured specifically for the purpose of implementing the TDMS device, a microcontroller, a microprocessor, a general or specific purpose computer operated by software which comprises instructions that implement the TDMS sorting operations, and/or a combination thereof. In one embodiment, a general-purpose computer is optionally not used. In traditional methodologies, such as Odd-Even Merge and Bitonic Merge, the only hardware sorting devices used were 2-sorters. Those two methodologies provided sorting networks to sort more than 2 values, using only 2-sorters.

U.S. Pat. Nos. 11,360,740, and 12,093,663, as well as Design, Implementation, and Analysis of High-Speed Single-Stage N-Sorters and N-Filters, Kent and Pattichis, December 2020, IEEE Access, Vol. 9, pp 2576-2591 and Use of Carry Chain Logic and Design System Extensions to Construct Significantly Faster and Larger Single-Stage N-Sorters and N-Filters, Kent and Pattichis, July 2022, IEEE Access, Vol. 10, pp 77689-79702, which are incorporated herein by reference, describe hardware sorting devices that are used to sort more than two values in a single-stage operation and which are faster than a network of 2-sorters. The single-stage devices, which sort more than 2 values, as well as the known prior art 2-sorters, provide fast sorting when instantiated as the hardware sorting devices in TDMS phase circuitry. The single-stage N-sorters, which are used to sort more than 2 values, are designed to sort a completely unordered input list. This type of device will provide desirable results when instantiated as the hardware sorting devices in TDMS sorting operation phases after the 1st phase. However, the operations in the first sorting phase are often themselves merge sort operations. In this case, a number of an N-sorter's two-value comparisons are already known, because the two values come from the same sorted list. Because of this, when an N-sorter is modified in order to perform a merge sort, the number of N-sorter hardware comparison structures will be reduced, and the N-sorter equations can be significantly simplified. The resultant single-stage N-merge device is faster and smaller. When an embodiment of the present invention instantiates these small and fast single-stage N-merge devices in a TDMS 1st sorting stage, the size and speed of the resultant TDMS network is significantly improved.

The TDMS embodiments disclosed here utilize 2-D arrays which receive data from several 1-D sorted input lists, are used to design the sequence of sorting phases which quickly merge the input list data into a single sorted output list, which is then easily transferred to a final 1-D sorted output list. Each 2-D array has a specific number of rows and columns, and a specific sorted order is defined for each full array, and each row and column in the array.

Embodiments can also use alternate 2-D arrays, in which the rows and columns are reversed from those described herein, and/or the arrays are rotated or mirrored from those that are otherwise described herein and/or the sorted order of the arrays, rows, and columns are reversed or otherwise modified. For example, instead of left to right, it can be done right to left. Instead of top to bottom the order can be from bottom to top. Thus, references made to locations or directions, like left, right, leftmost rightmost, top, bottom, up, down, etc. are merely used to provide a simple and clear explanation of the concepts of the present invention to a user and are not be understood as implying that some limitation exists or that the invention can only be practiced in this particular configuration or orientation. Alternate 2-D array systems, when they use the merge and/or sort principles described herein, are also covered by the disclosures here regardless of the array location that data is read from and or moved to.

Hardware merge devices are preferably hard-wired in the target hardware, such as in field-programmable gate arrays ("FPGAs"). The implemented merge processes are therefore data-oblivious. In other words, all of the sorting and merging operations are predefined, and are independent of the input values. Although these sorting operations are most preferably implemented in physical hardware, they can also optionally be used in central processing unit ("CPU") software applications or other hardware implementations where data-oblivious sorting and merging are desired, including for example graphical processing units ("GPU"), application specific integrated circuits ("ASIC") and for field-programmable gate arrays ("FPGA").

An embodiment of the present invention relates to a method for setting up and constructing an Order Reversed Merge Sort (ORMS) network embodiment device, this method comprising:

first, creating a ORMS final setup array, wherein;
  obtaining a number greater than one ("Nlists") of one-dimensional ("1-D") sorted data input lists;
  mapping values from each of said Nlists into an initial 2-D list array, wherein the said initial 2-D list array comprising a number greater than one ("Ncols") of columns and wherein the sorted data from each 1-D input list is mapped to a distinct sequence of rows in the initial 2-D list array in a row-major order, such that any unpopulated cells are positioned at the end of the sorted data in the rows designated for the particular input list; and
  in each set of distinct 2-D array rows for a given input list, the highest list values are placed in the top row, the lowest values and possibly unpopulated cells in the lowest row, with the values in each list row always greater than or equal to the values in each lower list row; and
  the first input list populates the top rows of the initial 2-D list array, and in each 2-D array row for the first list, the values from the sorted input list are placed in a first row sorted order, with the highest row list value placed in one edge column, and the remaining list row values placed in the first row order until the row is filled, possibly with unpopulated values filling the row if this is the lowest row and all of the first list values have already been placed, and
  for each subsequent input list after the first list, the list row values are placed in a similar manner in a distinct set of rows just below the set of rows for the previous list, but with the row sorted order the inverse of the previous list's row sorted order; and
  after the building of this initial 2-D array is complete, for each of the Ncols columns in the initial 2-D array, unpopulated cells slide to the bottom of the column, replaced by populated cells which slide up the column, until the column has a contiguous set of all populated cells in the column, starting from the topmost column cell, and
  removing any rows at the bottom of the array in which all cells are unpopulated;
  whereby the final setup array for the particular ORMS device is complete;
  after which the ORMS sort operation phases required to fully merge the input lists are then defined, set up, and constructed, wherein each phase reads in an input list of values defined in the same row and column structure as the final setup array, and the phase output values are written to an output list defined with the same 2-D structure, starting with a $1^{st}$ column sort phase, in which the input 2-D array set of values is the final setup array, wherein the populated cells in each array column are sorted, with the highest column value placed in the top output cell in the output 2-D array column, with the remaining column values in a non-increasing order down to the lowest populated output column cell, and the output 2-D array from the $1^{st}$ column sort phase becomes the input 2-D array for the second phase, called the $1^{st}$ row sort phase, in which each row of the phase input array is sorted in a predetermined order, and the output values are sent to the appropriate locations in the output 2-D array, based on the predetermined row sort order, after which if the phase output array is not in the predetermined fully sorted order, additional sort phases are implemented until the phase output 2-D array is in the predetermined fully sorted order, with the phases alternating between a column sort phase and a row sort phase as needed, and once a phase output 2-D array is in a predetermined fully sorted order, the 2-D array values are mapped to the final merge sort output 1-D list, completing the ORMS final setup array and implementation.

Optionally, the $1^{st}$ row sorted order can be used for the first input list in the initial setup array, ranges from the max row value on leftmost row cell to min row value at the rightmost row cell, and therefore the $2^{nd}$ row sorted order, used for the second input list, ranges from the max value at the rightmost row location to the min value at the leftmost row location, and all additional input lists alternate between the $1^{st}$ row sorted order and $2^{nd}$ row sorted order. The ORMS device values can be in the predetermined fully sorted order after the $1^{st}$ row sort stage. The column sort operations in the $1^{st}$ column sort phase can be performed by single-stage 2-way sorting devices. The column sort operations in the $1^{st}$ column sort phase can be performed by a sequence of single-stage 2-way sorting devices, with the devices often operating in parallel.

Embodiments of the present invention can include a method for setting up and constructing a Slide Merge Sort ("SMS") network embodiment device, the method comprising: first, creating a SMS final setup array, wherein;

obtaining a number greater than one ("Nlists") of one-dimensional ("1-D") sorted data input lists;

mapping values from each of said Nlists into a respective initial 2-D list array, each 2-D list array comprising a number greater than one ("Ncols") of columns and wherein the sorted data from each respective 1-D input list is mapped to its respective initial 2-D list array in a row-major order such that any unpopulated cells are positioned at the end of the sorted data;

combining the respective initial 2-D list arrays with a first of the initial 2-D list arrays defining a top edge, a left edge and a right edge of a final 2-D array, positioning successive initial 2-D list arrays such that each is positioned below a previous initial 2-D list array, and sliding each successive initial 2-D list array in a first direction by at least one column each, relative to the previous initial 2-D list array;

then sliding populated and unpopulated cells that are outside of the final 2-D array in a direction opposite of the first direction by Ncols, and possibly repeating this opposite direction Ncols slide until all populated and unpopulated cells are inside the left and right edges of the final 2-D array; and in each column, sliding unpopulated cells to the bottom of the column, and sliding populated cells up in the column until the populated cells comprise a contiguous list of populated cells, starting with the top column cell, and removing any rows at the bottom of the array in which all cells are unpopulated;

whereby the final 2-D array for the particular SMS device is complete;

after which the SMS sort operation phases required to fully merge the input lists are then defined, setup, and constructed, wherein each phase reads in an input list of values defined in the same row and column structure as the final setup array, and the phase output values are written to an output list defined with the same 2-D structure, starting with a $1^{st}$ column sort phase, in which the input 2-D array set of values is the final setup array, wherein the populated cells in each array column are sorted, with the highest column value placed in the top output cell in the output 2-D array column, with the remaining column values in a non-increasing order down to the lowest populated output column cell, and the output 2-D array from the $1^{st}$ column sort phase becomes the input 2-D array for the second phase, called the $1^{st}$ row sort phase, in which each row of the phase input array is sorted in a predetermined order, and the output values are sent to the appropriate locations in the output 2-D array, based on the predetermined row sort order, after which if the phase output array is not in the predetermined fully sorted order, additional sort phases are implemented until the phase output 2-D array is in the predetermined fully sorted order, with the phases alternating between a column sort phase and a row sort phase as needed, and once a phase output 2-D array is in a predetermined fully sorted order, the 2-D array values are mapped to the final merge sort output 1-D. list, completing the SMS setup and implementation.

The first direction can be to the right, and the number of columns that an array slides to the right is termed Nrightslide. The first direction can be to the left.

Embodiments of the present invention also relate to a method for setup and operation of Slide Merge Sort ("SMS") networks. In the setting up an SMS network, which merges Nlists 1-D sorted input lists into a single 1-D sorted output list, in the 1st SMS network setup step, the values from each sorted input list are mapped into an initial 2-D list array, one 2-D array per list, and with each list 2-D array containing Ncols columns, and with the sorted values from the 1-D input list mapped to the list 2-D array in a row-major order, and with the values in each 2-D array row ranging from the maximum at the left edge of the row to the minimum at the right edge of the row, and with the values in each row greater than or equal to all values in a lower row, and with the overall list maximum mapped to the upper left array cell of the top row, and with the overall list minimum mapped to the rightmost populated cell in the bottom row, and with the list array possibly containing unpopulated cells to the right of the list minimum in the bottom row, and In the 2nd SMS network setup step, the several list 2-D arrays are initially combined, with the first list 2-D array defining the top edge, the left edge, and the right edge of the final setup array, and each successive list 2-D array is placed below and touching the previous list 2-D array, with each successive list 2-D array sliding Nrightslide columns to the right, relative to the previous list 2-D array, and In the 3rd SMS network setup step, populated and unpopulated cells located to the right of the final 2-D array right edge slide to the left by Ncols columns, and if there still are any cells to the right of the Col 0 array right edge, these cells continue to slide left by Ncols columns, until all list cells are within the Ncols column 2-D array, and In the 4th SMS network setup step, if there any unpopulated cells in the combined 2-D array, the unpopulated cells slide to the bottom of the column that they are in, with populated cells in the same column sliding up to replace them, and In the 5th and final SMS network setup step, the definition of the final setup array is finalized, wherein.

if there are any fully unpopulated rows at the bottom of the 2-D array, these fully unpopulated rows are removed, after which the lowest row in the array containing a populated cell is defined as Row 0, with its bottom edge defining the bottom of the final setup array, and the row above Row 0 is defined as Row 1, and so on, and with Nrows being the number of rows in this final 2-D array, the top row is therefore Nrows−1, and the rightmost column of the 2-D array is defined as Col 0, with 2-D array column numbers increasing to the left, ending with the leftmost column being Col Ncols−1, and After completion of the SMS network final setup array, the setup of the sequence of sorting phases begins, in which said sorting phases, the data from the final setup array is incrementally processed into an identically-sized 2-D array, in which all of the array values are in sorted order, wherein the sorted order for data in even rows ranges from the maximum at the left array column, to the minimum at the rightmost row cell containing populated data, with unpopulated row cells located to the right of the rightmost populated cell, and the sorted order for data in odd rows ranges from the maximum at the right array column, to the minimum at the leftmost row cell containing populated data, with unpopulated row cells located to the left of the leftmost populated cell, and when in sorted order, all array data in any row is greater than or equal to all data in any lower row, and therefore, when in sorted order, the data in each column ranges from the maximum in the top row to the minimum in the lowest populated column cell, with unpopulated column cells placed below the minimum in the lowest populated column cell, and with each phase accepting an input 2-D array identically-sized to the final setup array, and after processing multiple parallel sorting operations using the phase input 2-D array values, produces an identically-sized phase output 2-D array, with the input 2-D array of the 1st sorting phase being the final setup array, and the output 2-D array of all phases, except the last phase, becoming the input 2-D array for the next phase in sequence, and the output 2-D array of the last phase, with the array values in sorted order, is then used to map the array values into the sorted order of the final SMS network 1-D sorted output list, and each sorting phase being either a column sort phase, wherein each input sort group of cells to be sorted is located in the same column, or a row sort phase, wherein each input sort group of cells to be sorted is located in the same row, and each phase sorting operation selects its input values from a specific set of sort group array locations in the phase input array, and then places the operation sorted values into the same set of sort group array locations in the phase output 2-D array, in accordance with the overall array sorted order, and any phase input 2-D array location which is not involved in a phase sorting operation is directly wired to the same location in the phase output 2-D array.

In one embodiment, Ncols=Nlists, that is, Ncols, the number of columns in each list 2-D array, and therefore the number of columns in the final setup array, is equal to Nlists, the number of SMS network 1-D sorted input lists, and Nrightslide=1, that is, in the 2nd SMS network setup step, Nrightslide, the number of columns that each list 2-D array slides to right, relative to the preceding list 2-D array, is equal to 1.

Optionally, the method can further include the 1st sorting operation being a column sort phase, in which each column of the input 2-D array is fully sorted, that is, each set of sort group locations includes all locations in an input array column, and the values in the output array column are placed according to the overall array sorted order, wherein a column sort operation in this 1st sorting phase may itself be a merge of sorted lists, and the 2nd sorting operation phase is defined as a row sort phase, in which each row of the input 2-D array is fully sorted, that is, each sort group contains preferably includes all locations in an input array row, and the values in the output array row are placed according to the overall row sorted order, and the 2nd sorting operation phase uses the output 2-D array of the 1st sorting operation phase as its input 2-D array, and after the completion of the 2nd sorting operation phase, the maximum 2 values in the top row of the phase output array are in their final sorted order array locations, and these two locations do not need to be a part of any subsequent sort group, and after the completion of the 2nd sorting operation phase, in a fully populated 2-D array, the minimum 2 values in the bottom row of the phase output array are in their final sorted order array locations, and these two locations do not need to be a part of any subsequent sort group.

Optionally in the method, Ncols=Nlists=3, and the 2nd sorting operation phase is followed by one additional sorting operation phase, a column sort phase, in which sort groups contain only 2 values, with both values in the same column, and in row 0, and all even rows which are not the highest array row, the 2 sort group values are selected from the left edge column, Col Ncols−1, and from the cells in said even row and the odd row that is one row higher, and in row 1, and all odd rows which are not the highest array row, the 2 sort group values are selected from the right edge column, Col 0, and from the cells in said odd row and the even row that is one row higher, and the values in the output array sort group column are placed according to the overall column sort order, and no column sort operations are performed on the middle column, Col 1, and the output 2-D array of this 3rd sorting operation phase is the final phase output 2-D array, whose sorted order values are then mapped into the final 1-D sorted output list.

In one embodiment, for Ncols=Nlists=4, and the 2nd sorting operation phase is followed by 2 additional sorting operation phases, starting with a column sort phase as the 3rd operation phase, in which sort groups contain only 2 values, with both values in the same column, and in row 0 and all even rows which are not the highest array row, the 2 sort group values are selected from the left edge column, Col Ncols−1, and from the cells in said even row and the odd row that is one row higher, and in row 1 and all odd rows which are not the highest array row, the 2 sort group values are selected from the right edge column, Col 0, and from the cells in said odd row and the even row that is one row higher, and the values in the output array sort group column are placed according to the overall column sort order, and no column sort operations are performed on the middle 2 columns, Cols 2 and 1, and the output 2-D array of said 3rd sorting operation phase becomes the input 2-D array of the 4th and final sorting operation phase, a row sort phase, in which the sort group values in the output array row are placed according to the overall row sorted order, and the sort group for each row includes all row locations, except for the maximum 2 values in the top row, and except for the minimum 2 values in the bottom row of a fully populated 2-D array.

In one embodiment, for Ncols=Nlists=5, and the 2nd sorting operation phase is followed by 2, additional sorting operation phases, and starting with a column sort phase as the 3rd sorting operation phase, in which sort groups in Cols 1 and Ncols−2 contain only 2 values, with both values in the same column, and in row 0, and all even rows which are not the highest array row, the 2 sort group values are selected from the Col Ncols−2 column, and from the cells in said even row and the odd row that is one row higher, and in row 1, and all odd rows which are not the highest array row, the 2 sort group values are selected from the Col 1 column, and from the cells in said odd row and the even row that is one row higher, and sort groups in Cols 0 and Ncols−1 contain all cells in the given column, except for the maximum overall value in the top row and the minimum overall value in the bottom row, and the values in the output array sort group column are placed according to the overall column sort order, and no column sort operations are performed on the middle column, Col 2, and the output 2-D array of this 3rd sorting operation phase becomes the input 2-D array of the 4th and final sorting operation phase, a row sort phase, in which the sort group values in the output array row are placed according to the overall row sorted order, and the sort group for each row includes all row locations, except for the maximum 2 values in the top row, and except for the minimum 2 values in the bottom row of a fully populated 2-D array.

Optionally, for Ncols=Nlists>=6, and the 2nd sorting operation phase is followed by more than 2 additional sorting operation phases, starting with a column sort phase as the 3rd sorting operation phase, in which column sort groups will not include the top row locations containing the overall maximum 2 values, and column sort groups in a fully populated 2-D array will not include the bottom row locations containing the overall minimum 2 values, and the values in the output array sort group column are placed according to the overall column sort order, and the output 2-D array of this 3rd sorting operation phase becomes the input 2-D array of the 4th sorting operation phase, a row sort phase, in which the sort group values in the output array row are placed according to the overall row sorted order, the sort group for each row includes all row locations, except for the maximum 2 values in the top row, and except for the minimum 2 values in the bottom row of a fully populated 2-D array. For Ncols=Nlists=6, and the 4th sorting operation phase is followed by one additional sorting operation phase, the 5th and final sorting operation phase, a column sort phase, in which sort groups contain only 2 values, with both values in the same column, and in row 0, and all even rows which are not the highest array row, the 2 sort group values are selected from the left edge column, Col Ncols−1, and from the cells in said even row and the odd row that is one row higher, and in row 1, and all odd rows which are not the highest array row, the 2 sort group values are selected from the right edge column, Col 0, and from the cells in said odd row and the even row that is one row higher, and the values in the output array sort group column are placed according to the overall column sort order, and no column sort operations are performed on the middle columns, Col N−2 on the left to Col 1 on the right, and the output 2-D array of this 3rd sorting operation phase is the final phase output 2-D array, whose sorted order values are then mapped into the final 1-D sorted output list.

Optionally, when 15>Ncols=Nlists>6, and the 4th sorting operation phase is followed by two additional sorting operation phases, then starting with a column sort phase as the 5th sorting operation phase, in which column sort groups will not include the top row locations containing the overall maximum 2 values, and column sort groups in a fully populated 2-D array will not include the bottom row locations containing the overall minimum 2 values, and the values in the output array sort group column are placed according to the overall column sort order, and the output 2-D array of this 5th sorting operation phase becomes the input 2-D array of the 6th and final sorting operation phase, a row sort phase, in which the sort group values in the output array row are placed according to the overall row sorted order, the sort group for each row includes all row locations, except for the maximum 2 values in the top row, and except for the minimum 2 values in the bottom row of a fully populated 2-D array.

In one embodiment, the input values for the two or more lists can be obtained from a plurality of flip flop registers and input into the semiconductor that performs the merge and sort operations. The semiconductor preferably includes a plurality of multiplexers that are implemented such that the input signal lines of the multiplexers and the select line of the multiplexers are provided with values from one or more lookup tables, which lookup tables are populated with values from a comparison block of the semiconductor, which comparison block performs either a row sort or a column sorting operation described in more detail above. The semiconductor preferably has a plurality of input ports and at least one output port, the input ports preferably comprising at least one and more preferably a plurality of input buses and the at least one output port has at least one output bus and more preferably a plurality of output buses. For example, in one embodiment, each input port includes a bus and each output port includes a bus, and a grouped array of signal lines. For example, if there are 4 inputs and 4 outputs, there are preferably 8 buses. If a system is configured to work on 8-bit values, each input and output bus preferably has an array of 8 signal lines; whereas if a system is configured to work on 32-bit values, each bus preferably has an array of 32 signal lines—and, in both cases there are preferably a total of 8 buses. Optionally, the comparison block can perform comparison carry chain logic to implement the sorting and merging operations and more specifically the comparisons of values that happen during those sorting and merging operations including column and row sorting.

Referring now to FIGS. 11A-14, an example of a 4 column, two row, ORMS is illustrated, wherein FIG. 11A illustrates a final input array setup, while the cells have been re-labeled as a single group. These cell labels are then used in FIGS. 12, 13 and 14 to illustrate an FPGA implementation.

In those figures, the 8 input port busses, each bus with 8 (bits) signals, come in from the left. Two input values from each list go to the column 0 sorter, and 2 input values from each list go to the column 1 sorter, as illustrated below the column 0 sorter. The sorted column output values range from the max at OUT_3 to the min at OUT_0. There are only 2 columns, so each row of the 4 rows in the row sort phase is sorted by a classic single-stage 2-sorter.

The overall sorted output min value is applied to output port OUT_0. The overall sorted output max value is applied to output port OUT_7 and so on. Each column sort block is a preferably a single-stage 2-way merge sorter. There are a total of 6 single-stages devices in this merge sorter, so there are a total of 6 comparison blocks in this merge sorter.

Figure 13:
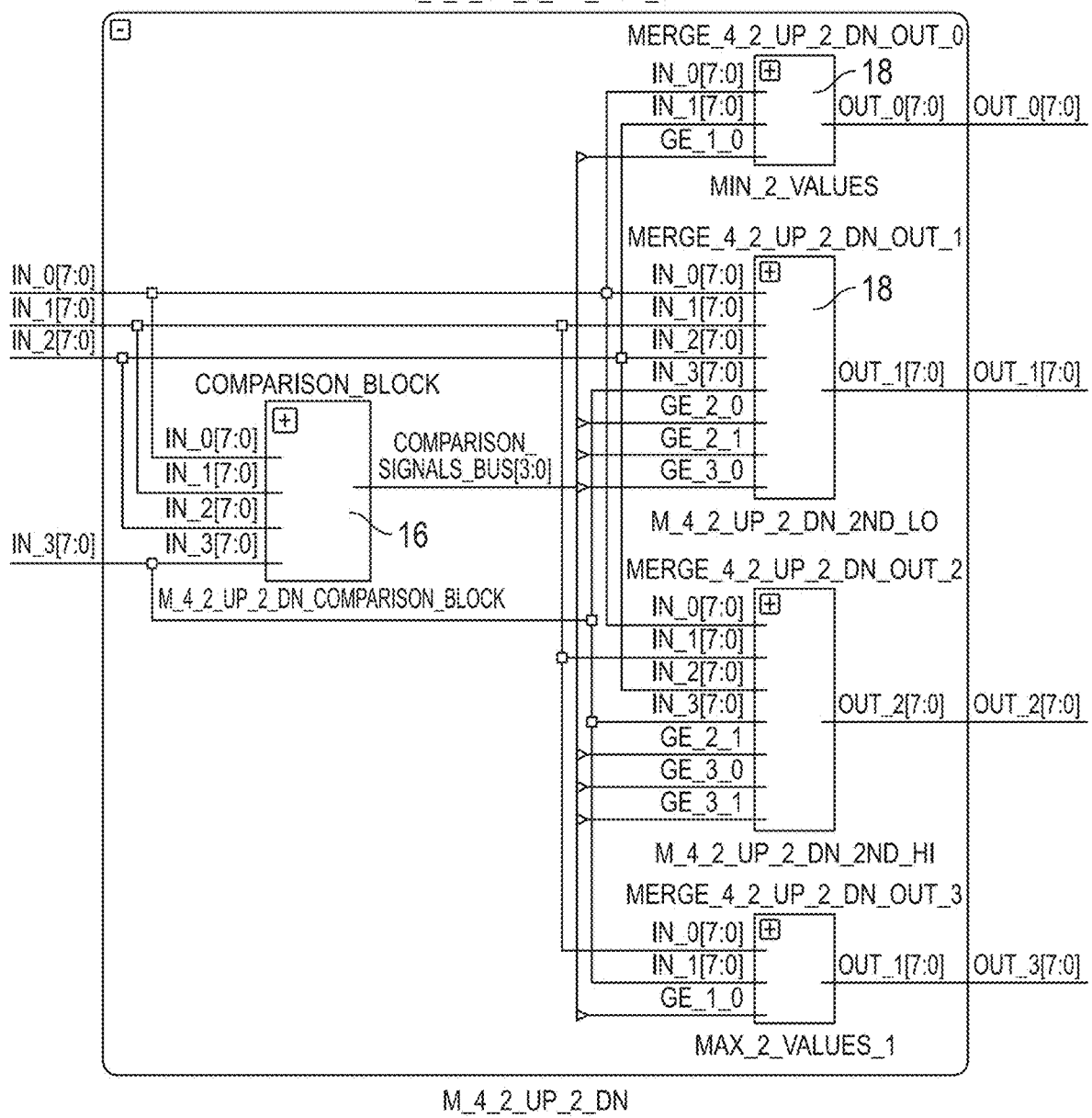
FIG. 13 is a drawing which illustrates further detail of the upper left column sorter of the FPGA layout of FIG. 12.

At the top of FIG. 13, the column 0 sorter is expanded. The comparison block for the sorter is shown and labelled at the left. The four output multiplexers are shown in a vertical arrangement at the right. The min multiplexer at the top and max multiplexer at the bottom have 2 data inputs and one select line, which is a comparison output signal. The middle two output multiplexers have (all) 4 data inputs, and 3 select line inputs. The max and min multiplexers only have 3 inputs per bit, so each bit multiplexer is implemented in a single 6-input lookup table.

Figure 14:
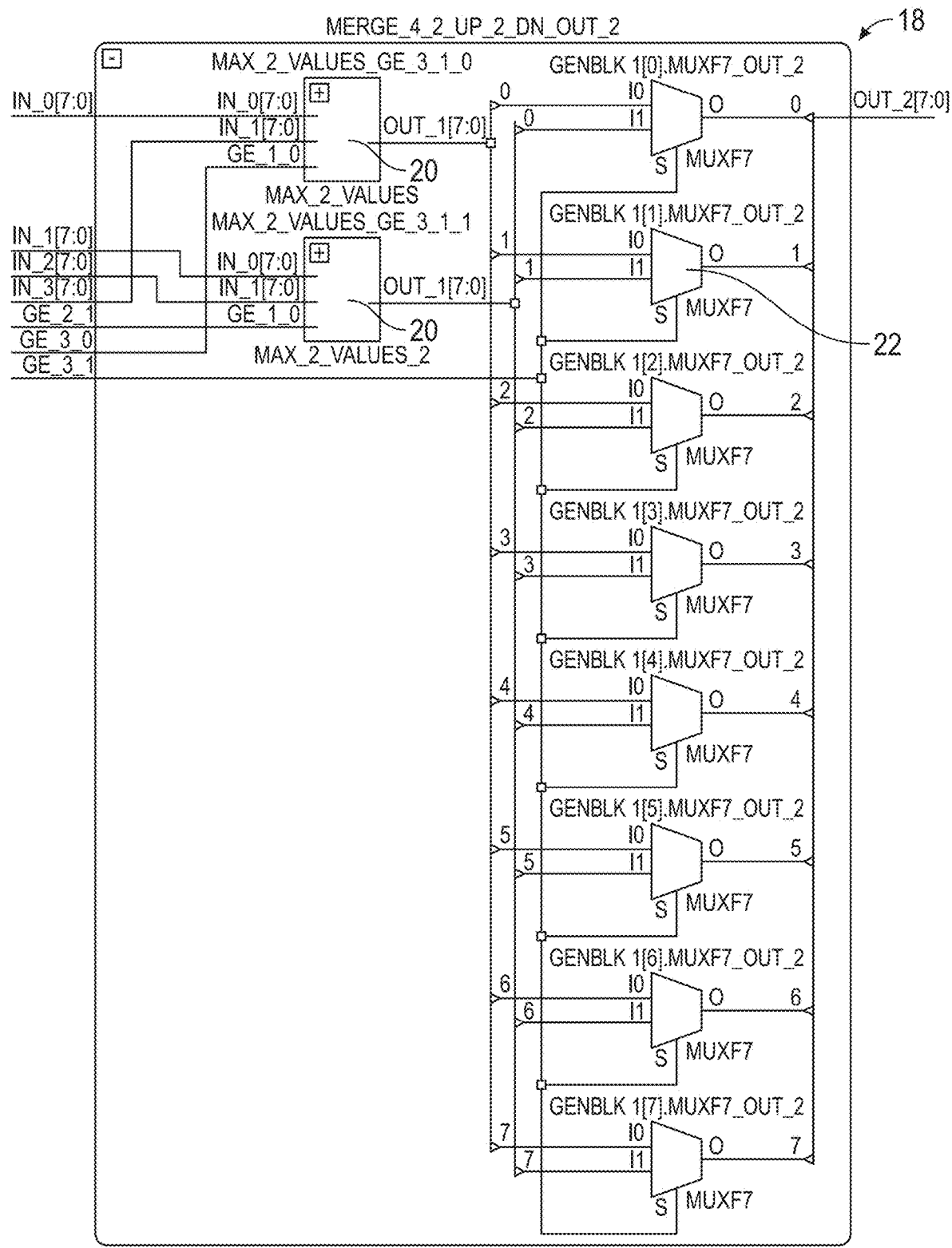
FIG. 14 is a drawing which illustrates further detail of an output multiplexer of the column sorter of FIG. 13.

In FIG. 14, one of the middle output multiplexers is expanded. The middle output multiplexers have 7 inputs per bit, so each cannot be implemented in a single 6-input lookup table. Each bit is implemented in 2 adjacent lookup tables, and a hardware MUXF7 2-to-1 multiplexer which combines the 2 lookup table output signals.

FIG. 12 illustrates a high level FPGA implementation 10 of an ORMS for the final array setup of FIG. 11A. As can be seen, FPGA implementation 10 first passes values from the array which enters on the left of the figure, into a pair of column sorters 12, before the values then pass to a plurality of row sorters 14. FIG. 13 provides a more granular view of the upper column sorter 12 of FIG. 12. As can be seen therein, column sorter 12 preferably includes comparison block 16 and a plurality of multiplexers 18. FIG. 14 illustrates a more granular view of a configuration of multiplexer 18 (in this particular instance the multiplexer that is depicted is the second from the top of FIG. 13). As can be seen therein, each multiplexer 18 preferably includes a plurality of lookup tables 20 and a plurality of bitwise 2:1 multiplexers.

For example, in one embodiment, the present invention relates to a method for sorting and merging lists of values with a semiconductor, the method including receiving the plurality of sorted input lists of values into at least one input bus of the semiconductor, the semiconductor arranging the values into an input array comprising a number of columns and a number of rows, wherein the number of columns is at least equal to the number of received sorted input lists and wherein the number of rows is at least enough to hold all values of the sorted input lists, and wherein the input array is populated with a largest value of a first sorted input list disposed in a first row and first column of the input array, with any remaining values of the first sorted list disposed in successive cells of the input array in row-major fashion in a first direction, and a largest value of a second sorted input list disposed in a first open cell of a second column with any remaining values of the second sorted list disposed in successive cells of the input array in a row-major fashion in the first direction, and the semiconductor processing the input array with a respective comparison block for each of the sorts the columns and the rows of the input array by populating one or more lookup tables with values based on comparisons and wherein multiplexers implement the merging and the sorting based on the values populated within the one or more lookup tables.

In the method, the semiconductor preferably sorts the rows using straight row sorting or using serpentine row sorting. The step of receiving a plurality of sorted input lists can include receiving three sorted lists of values and the input array can include five columns and the remaining values of the first sorted input list and the remaining values of the second sorted input list are each disposed in a respective three successive columns of the input array. In one implementation, a largest value of a third sorted input list is disposed in a first open cell of a third column with any remaining values of the third sorted input list are disposed in successive cells of the input array in a row-major fashion in the first direction. The method can also include manipulating cell data locations of the input array before the semiconductor sorts the columns and rows, wherein manipulating cell locations can include moving values from a fourth column of the input array over to a first column of the input array, and moving values from a fifth column of the input array over to a second column of the input array. The method can also include shifting values within each of the first column, the second column, and the third column to fill imbedded open cells with values and removing any rows containing only empty cells. The first row can be a top row or the first row can be a bottom row. The first column can be a leftmost column or it can be a rightmost column. The step of receiving a plurality of sorted input lists can include receiving more than two sorted input lists and for each of the plurality of sorted input lists after the second sorted input list, a first value thereof can be input into a column of the input array which is adjacent to a column in which a first value of the previous list was input.

The method can also include the step of manipulating cell data locations of the input array before the semiconductor sorts the columns and rows of the input array and manipulating cell locations can include shifting values of cells within at least some of the columns such that all values of all of the plurality of sorted input lists are disposed within only a subset of the columns. The semiconductor can sort the columns and rows using serpentine sorting such that even rows of the input array contain values such that a maximum value of each even row is positioned at a first end thereof and such that odd rows of the array are sorted by the semiconductor such that a maximum value of each odd row is positioned at a second end thereof.

Embodiments of the present invention also relate to a method for sorting and merging lists of data with a semiconductor including numerically sorting a plurality of input lists, passing the data into an input array having a number of columns and a number of rows, wherein the number of columns is at least equal to the number of input lists and wherein the number of rows is at least enough to hold all values of the sorted input lists, and wherein when the input array is populated with a largest value of a first input list in a first row and first column of the input array, with any remaining values of the first sorted list disposed in successive cells of the input array in row-major fashion in a first direction and a largest value of a second input list is disposed in a first open cell of a second column with any remaining values of the second sorted list disposed in successive cells of the input array in a row-major fashion in a direction that is opposite that of the immediately preceding list, using a comparison block of the semiconductor to sort columns of the input array such that the values contained therein are in a descending numerical order and to sort rows of the array to produce a merged and sorted output of the first and second input lists by populating values into one or more lookup tables and applying signals based on the populated values to input signal and select lines of a plurality of multiplexers such that sorted and merged values of the plurality of input lists are passed to at least one output bus of the semiconductor. The comparison block sorts the rows of the array by performing straight row sorting.

Although this application describes setting up an input array in a predetermined configuration and then performing a column sorting operation and one or more other row and column sorting operations, it is to be understood that although the values within some or all of the rows may change after the first column sort is performed, when reference is made to sort the rows of the input array, it is to be understood that the rows that are sorted are the rows of values which may have changed after the first or subsequent column sort. Thus, the terminology, nomenclature, and concept of sorting the rows of the input array still apply even if the data contained in those rows may have changed from their initial values when the input array was first created. The terms, "a", "an", "the", and "said" mean "one or more" unless context explicitly dictates otherwise. Note that in the specification and claims, "about", "approximately", and/or "substantially" means within twenty percent (20%) of the amount, value, or condition given.

Although the invention has been described in detail with particular reference to the disclosed embodiments, other embodiments can achieve the same results. Variations and modifications of the present invention will be obvious to those skilled in the art and it is intended to cover all such modifications and equivalents. The entire disclosures of all references, applications, patents, and publications cited above and/or in the attachments, and of the corresponding application(s), are hereby incorporated by reference. Unless specifically stated as being "essential" above, none of the various components or the interrelationship thereof are essential to the operation of the invention. Rather, desirable results can be achieved by substituting various components and/or reconfiguration of their relationships with one another.

What is claimed is:

1. A method for merging sorted input lists of values into a single sorted output list with a hardware merge sort device, the method comprising:
   creating an input array comprising a plurality of columns and a plurality of rows, wherein the plurality of columns is at least equal to the plurality of sorted input lists and wherein the plurality of rows is at least enough to hold all of the values of the sorted input lists, and wherein the input array is populated such that it comprises:
   a largest value of a first sorted input list disposed in a first row and a first column of the input array, with any remaining values of the first sorted input list disposed in successive cells of the input array in row-major fashion in a first direction; and
   applying a column offset to a second sorted input list, such that a largest value of the second sorted input list is disposed in a first open cell of a second column of the input array, with any remaining values of the second sorted input list disposed in successive cells of the input array in a row-major fashion in the first direction;
   causing the values of the sorted input lists of the hardware merge sort device to be mapped to their specified locations in the input array;
   the hardware merge sort device sorting the plurality of columns of the input array with column sorters, such that the values contained therein are in a sorted numerical order;
   the hardware merge sort device sorting the plurality of rows of a column sort output array with row sorters; and
   the hardware merge sort device outputting a plurality of sorted output values from the row sorters to the single sorted output list of the hardware merge sort device.

2. The method of claim 1 wherein the hardware merge sort device sorting the plurality of rows of the column sort output array comprises the hardware merge sort device performing straight row sorting of the plurality of rows of the column sort output array.

3. The method of claim 1 wherein the hardware merge sort device sorting the plurality of rows of the column sort output array comprises the hardware merge sort device performing serpentine row sorting of the plurality of rows of the column sort output array.

4. The method of claim 1 wherein the input array comprises five columns and wherein the remaining values of the first sorted list and the remaining values of the second sorted list are each disposed in a respective three successive columns of the input array.

5. The method of claim 4, wherein a largest value of a third input list is disposed in a first open cell of a third column with any remaining values of the third sorted list disposed in successive cells of the input array in a row-major fashion in the first direction.

6. The method of claim 4, further comprising the step of manipulating cell locations of the input array before the steps of the hardware merge sort device sorting the plurality of columns and the hardware merge sort device sorting the plurality of rows, wherein manipulating cell locations comprises:
   moving values from a fourth column of the input array over to a first column of the input array; and
   moving values from a fifth column of the input array over to a second column of the input array.

7. The method of claim 6 further comprising shifting values within each of the first column, the second column, and the third column to fill imbedded open cells with values and removing any rows containing only empty cells.

8. The method of claim 1 wherein the first row is a top row.

9. The method of claim 1 wherein the first row is a bottom row.

10. The method of claim 1 wherein the first column is a leftmost column.

11. The method of claim 1 wherein the first column is a rightmost column.

12. The method of claim 1 wherein for each input list after the second input list, a first value thereof is input into a column of the input array which is adjacent to a column where the first value of an immediately preceding list was input.

13. The method of claim 12 further comprising the step of manipulating cell value locations of the input array before the steps of sorting the plurality of columns and sorting the plurality of rows, wherein manipulating cell value locations comprises shifting values of cells within at least some of the plurality of columns such that all values of all lists are disposed within only a subset of the plurality of columns.

14. The method of claim 13 wherein sorting the plurality of rows of the column sort output array comprises serpentine sorting such that a maximum value of each even row is positioned at a first end thereof and sorting odd rows such that a maximum value of each odd row is positioned at an end opposite the first end.

15. The method of claim 1 wherein the hardware merge sort device sorting the plurality of columns of the input array comprises the hardware merge sort device sorting the plurality of columns by applying an output of a comparison block to select line inputs of a plurality of multiplexers.

16. The method of claim 15 further comprising using the outputs of a plurality of lookup tables as inputs for the plurality of multiplexers.

17. A method for merging sorted input lists of values into a single sorted output list with a hardware merge sort device, the method comprising:
creating an input array comprising a plurality of columns and a plurality of rows, wherein the plurality of columns is at least equal to the plurality of sorted input lists and wherein the plurality of rows is at least enough to hold all of the values of the sorted input lists, and wherein the input array is populated such that it comprises:
a largest value of a first sorted input list disposed in a first row and a first edge column of the input array, with any remaining values of the first sorted input list disposed in successive cells of the input array in row-major fashion in a first direction; and
a largest value of a second sorted input list disposed in a first open row and a second edge column of the input array, the second edge column opposite to the first edge column, with any remaining values of the second sorted input list disposed in successive cells of the input array in a row-major fashion in a direction that is opposite that of an immediately preceding list;
causing the values of the sorted input lists of the hardware merge sort device to be mapped to their specified locations in the input array;
the hardware merge sort device sorting the plurality of columns of the input array with column sorters, such that the values contained therein are in a sorted numerical order;
the hardware merge sort device sorting the plurality of rows of a column sort output array with row sorters; and
the hardware merge sort device outputting a plurality of sorted output values from the row sorters to the single sorted output list of the hardware merge sort device.

18. The method of claim 17 wherein sorting the plurality of rows of the column sort output array comprises straight row sorting.

19. The method of claim 17 wherein the hardware merge sort device sorting the plurality of columns of the input array comprises the hardware merge sort device sorting the plurality of columns by applying an output of a comparison block to select input lines of a plurality of multiplexers.

20. The method of claim 19 further comprising using the outputs of a plurality of lookup tables as inputs for the plurality of multiplexers.

* * * * *